United States Patent
Anderson et al.

(10) Patent No.: US 9,210,141 B2
(45) Date of Patent: Dec. 8, 2015

(54) SYSTEM AND METHOD FOR PROVIDING SCORECARDS TO VISUALIZE SERVICES IN AN INTELLIGENT WORKLOAD MANAGEMENT SYSTEM

(75) Inventors: Eric W. B. Anderson, Alpine, UT (US); Alan Murray, Boston, MA (US); Adam Spiers, London (GB)

(73) Assignee: Novell, Inc, Provo, UT (US)

( * ) Notice: Subject to any disclaimer, the term of this patent is extended or adjusted under 35 U.S.C. 154(b) by 1242 days.

(21) Appl. No.: 12/757,674

(22) Filed: Apr. 9, 2010

(65) Prior Publication Data
US 2011/0125895 A1    May 26, 2011

Related U.S. Application Data

(60) Provisional application No. 61/264,562, filed on Nov. 25, 2009.

(51) Int. Cl.

| | |
|---|---|
| *G06F 15/173* | (2006.01) |
| *H04L 29/06* | (2006.01) |
| *H04L 9/32* | (2006.01) |
| *G06F 9/455* | (2006.01) |
| *G06F 21/31* | (2013.01) |
| *G06Q 10/06* | (2012.01) |
| *G06Q 10/10* | (2012.01) |

(52) U.S. Cl.
CPC ............. *H04L 63/08* (2013.01); *G06F 9/455* (2013.01); *G06F 21/31* (2013.01); *H04L 9/3213* (2013.01); *H04L 63/0807* (2013.01); *H04L 63/0815* (2013.01); *H04L 63/14* (2013.01); *G06Q 10/06* (2013.01); *G06Q 10/06313* (2013.01); *G06Q 10/10* (2013.01)

(58) Field of Classification Search
CPC .... G06F 21/41; G06F 9/3877; H04L 63/0815
USPC .......................................................... 709/224
See application file for complete search history.

(56) References Cited

U.S. PATENT DOCUMENTS

| | | | |
|---|---|---|---|
| 8,239,509 B2 * | 8/2012 | Ferris et al. .................... | 709/223 |
| 2005/0144022 A1 * | 6/2005 | Evans ............................... | 705/1 |

(Continued)

OTHER PUBLICATIONS

White Paper: "A Blueprint for Better Management from the Desktop to the Data Center", Feb. 2007, Novell, Inc., 17 pages.

(Continued)

*Primary Examiner* — Krista Zele
*Assistant Examiner* — James Forman
(74) *Attorney, Agent, or Firm* — Schwegman Lundberg & Woessner, P.A.

(57) ABSTRACT

The system and method described herein for providing scorecards to visualize services in an intelligent workload management system may include a computing environment having a model-driven, service-oriented architecture for creating collaborative threads to manage workloads. In particular, the management threads may converge information for describing services, applications, workloads, in an information technology infrastructure. For example, a discovery engine may reference an identity vault to capture enriched models of an infrastructure, and a management infrastructure may then generate one or more scorecards that can be used to manage the infrastructure. In particular, the scorecards may provide information for tuning or otherwise controlling risk, complexity, cost, availability, and agility versus rigidness in the infrastructure.

20 Claims, 8 Drawing Sheets

(56) References Cited

U.S. PATENT DOCUMENTS

| | | | |
|---|---|---|---|
| 2006/0077438 A1* | 4/2006 | Lovat et al. | 358/1.15 |
| 2006/0085530 A1* | 4/2006 | Garrett | 709/223 |
| 2006/0235733 A1* | 10/2006 | Marks | 705/7 |
| 2006/0265702 A1 | 11/2006 | Isaacson et al. | 717/168 |
| 2006/0265706 A1 | 11/2006 | Isaacson et al. | 717/174 |
| 2006/0277542 A1 | 12/2006 | Wipfel | 717/174 |
| 2007/0136788 A1* | 6/2007 | Monahan et al. | 726/3 |
| 2007/0233508 A1* | 10/2007 | Gillespie | 705/1 |
| 2007/0250833 A1* | 10/2007 | Araujo et al. | 718/1 |
| 2008/0021997 A1* | 1/2008 | Hinton | 709/225 |
| 2008/0098392 A1 | 4/2008 | Wipfel et al. | 718/1 |
| 2008/0098457 A1* | 4/2008 | Carter | 726/2 |
| 2008/0256535 A1 | 10/2008 | Carter et al. | 718/1 |
| 2008/0281654 A1 | 11/2008 | Carter et al. | 705/7 |
| 2009/0063665 A1* | 3/2009 | Bagepalli et al. | 709/222 |
| 2009/0288082 A1 | 11/2009 | Nazeer et al. | 718/1 |
| 2010/0131959 A1* | 5/2010 | Spiers et al. | 718/105 |
| 2010/0198649 A1* | 8/2010 | Appleyard et al. | 705/9 |
| 2010/0250298 A1* | 9/2010 | Channabasavaiah et al. | 705/7 |
| 2010/0269109 A1* | 10/2010 | Cartales | 718/1 |

OTHER PUBLICATIONS

White Paper: "SOA + Workload Management + Application Infrastructure Virtualization: The Winning Combination for Meeting Service Delivery Goals", Sep. 2008, Ptak, Noel & Associates LLC, 12 pages.

White Paper: "Novell® Architectural Foundation—A Technical Vision for Computing and Collaborating with Agility", Jan. 23, 2009, Novell, Inc., 61 pages.

Technical White Paper: "Automation for the New Data Center", copyright 2006, Novell, Inc., 11 pages.

Product Information Sheet: "VMware Virtual Infrastructure—Solutions for the Responsive Enterprise", copyright 2005, VMware, Inc., 4 pages.

Cialdini, Robert B., *Influence: The Psychology of Persuasion*, Collins Business Essentials, copyright 1984, 335 pages.

Freeman, Eric Thomas, "The Lifestreams Software Architecture", Dissertation, Yale University, May 1997, 185 pages.

Google Wave API Overview—Google Wave API—Google Code, printed from http://code.google.com/apis/wave/guide.html, copyright 2009, Google, 3 pages.

U.S. Appl. No. 61/224,206, filed Jul. 9, 2009.

U.S. Appl. No. 12/290,865, filed Nov. 4, 2008.

U.S. Appl. No. 12/386,157, filed Apr. 14, 2009.

U.S. Appl. No. 12/540,650, filed Aug. 13, 2009.

Lassen, Soren, et al., "Google Wave Federation Architecture", printed from http://www.waveprotocol.org/whitepapers/coogle-wave-architecture, 6 pages.

Rodger, Alan, "Technology Audit—SmartPeak WLM v7.1", Reference Code TA001227SIF, Apr. 2007, Butler Group, 9 pages.

Zhang, Hui, et al., "Intelligent Workload Factoring for a Hybrid Cloud Computing Model", NEC Laboratories America, 9 pages.

* cited by examiner

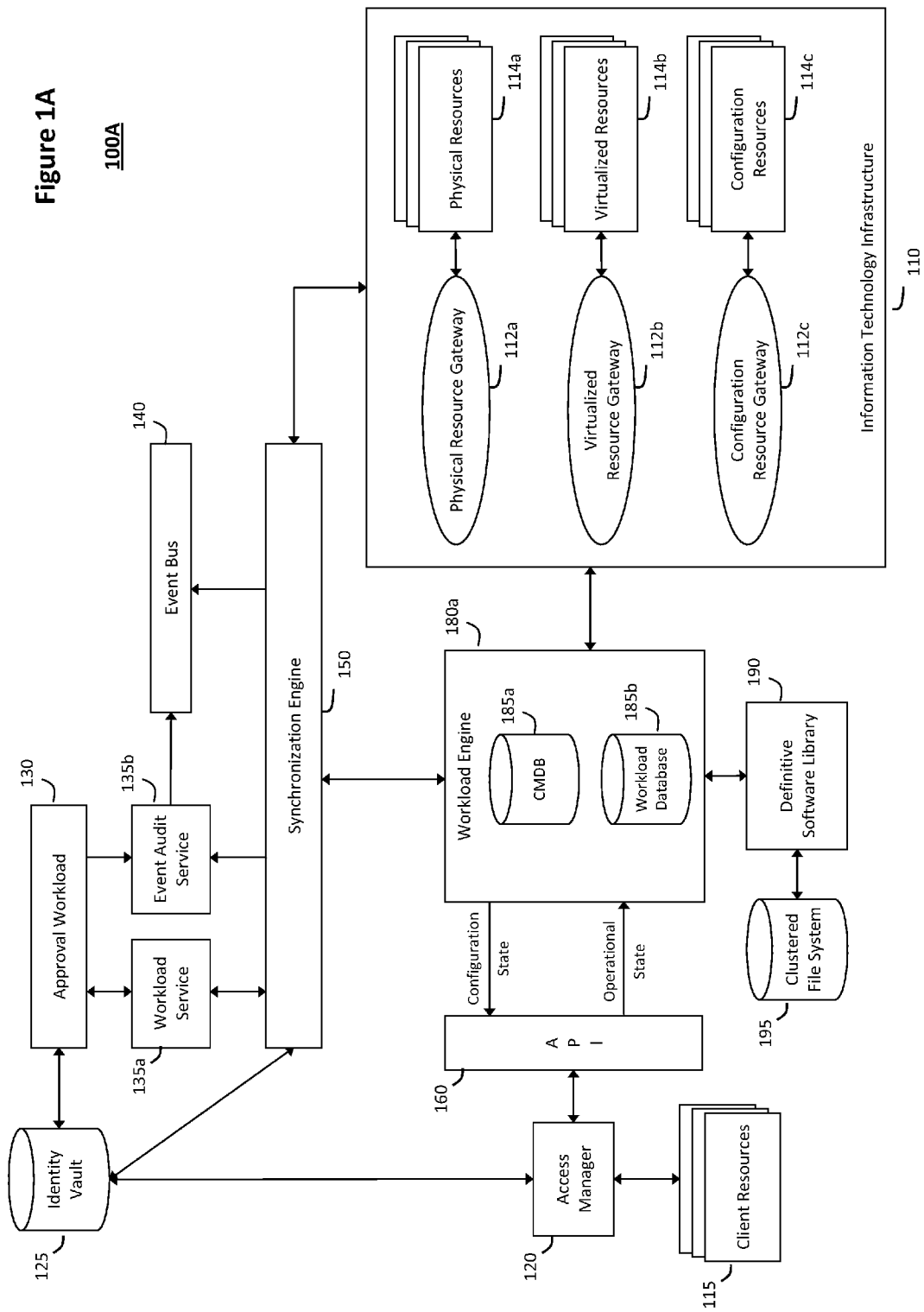

Service Listing

Your service listing describes all the services, applications, and workloads in your environment. It scores each of these on the basis of business value (BV), usage (U), and cost (C). Select the total cost link for additional details and to create a movement or retirement plan.

| ID | Service Name | Resource Names | BV | U | U / Hr. | C / Resource | Total Cost |
|---|---|---|---|---|---|---|---|
| 101 | SAP | AP | 5 | 34 | $2,285.00 | $672.00 | $1,535,520.00 |
| 103 | SAP | IS&T | 3 | 1 | $137.33 | $318.00 | $43,670.94 |
| 201 | PeopleSoft | HR | 5 | 7 | $42.38 | $832.00 | $35,260.16 |

Figure 5A

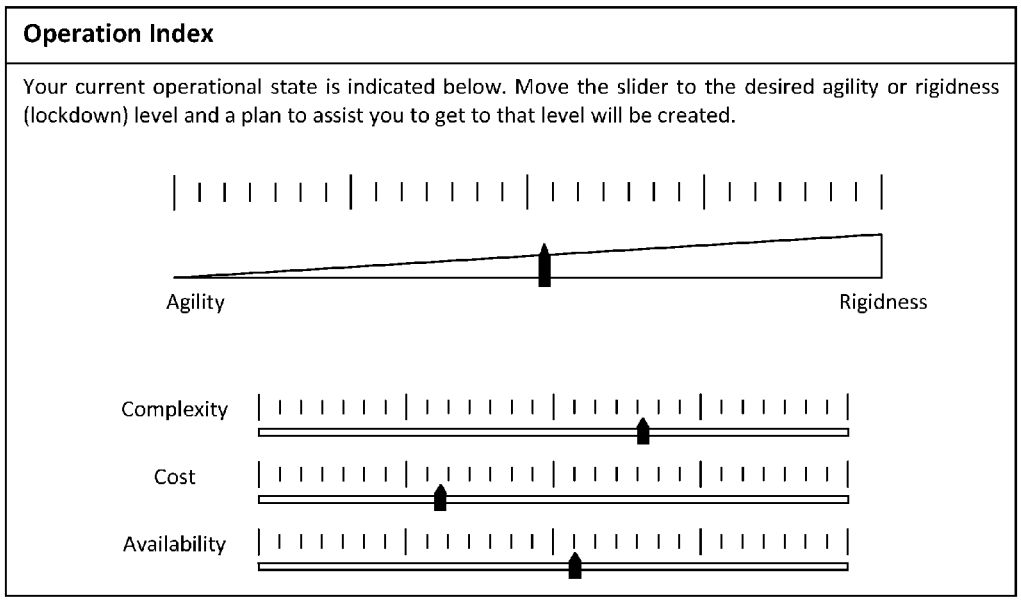

Figure 5B

Risk Heat Map

Your current risk to coverage ratio is displayed below. RED (5) areas indicate highest risk to coverage ratios, ORANGE (4) areas indicate high risk to coverage ratios, YELLOW (3) areas indicate moderate risk to coverage ratios, GREEN (2) areas indicate low risk to coverage ratios, and WHITE (1) areas indicate lowest risk to coverage ratios. Click the colored region for additional details and how to improve the risk to coverage ratio.

Risk Area

| | | | | | | |
|---|---|---|---|---|---|---|
| SOX | GREEN (2) | YELLOW (3) | GREEN (2) | WHITE (1) | WHITE (1) | |
| PCI | ORANGE (4) | GREEN (2) | GREEN (2) | GREEN (2) | RED (5) | |
| HIPAA | WHITE (1) | WHITE (1) | GREEN (2) | ORANGE (4) | YELLOW (3) | |
| ITIL | GREEN (2) | YELLOW (3) | YELLOW (3) | RED (5) | YELLOW (3) | |
| COBIT | YELLOW (3) | WHITE (1) | GREEN (2) | GREEN (2) | GREEN (2) | |
| | 20 % | 40 % | 60 % | 80 % | 100 % | Coverage Ratio |

Figure 5C

Service Placement Scorecard

Your service placement scorecard determines the most effective placement for services, applications, or workloads based on security (S), risk (R), cost (C), and performance (P). Select the recommended target link for additional details and to create a movement plan.

| ID | I-ID | Service Name | S | R | C | P | Total | Recommended Target |
|---|---|---|---|---|---|---|---|---|
| 100 | 101 | SAP | 5 | 5 | 4 | 5 | 19 | Physical |
| | 102 | SAP | 4 | 4 | 2 | 3 | 13 | Virtual |
| | 103 | SAP | 1 | 3 | 1 | 1 | 6 | Cloud |
| 200 | 201 | PeopleSoft | 5 | 5 | 3 | 5 | 18 | Virtual |
| 300 | 301 | Clarity | 5 | 5 | 5 | 4 | 19 | Physical |
| | 302 | Clarity | 5 | 4 | 4 | 4 | 17 | Physical |
| | 302 | Clarity | 1 | 3 | 1 | 3 | 8 | Cloud |

Figure 5D

SYSTEM AND METHOD FOR PROVIDING SCORECARDS TO VISUALIZE SERVICES IN AN INTELLIGENT WORKLOAD MANAGEMENT SYSTEM

CROSS-REFERENCE TO RELATED APPLICATIONS

This application claims the benefit of U.S. Provisional Patent Application Ser. No. 61/264,562, entitled "System and Method for Intelligent Workload Management," filed on Nov. 25, 2009, the contents of which are hereby incorporated by reference in entirety.

In addition, this application is further related to co-pending U.S. patent application Ser. No. 12/725,241, entitled "System and Method for Intelligent Workload Management," filed on Mar. 16, 2010, co-pending U.S. patent application Ser. No. 12/725,263, entitled "System and Method for Recording Collaborative Information Technology Processes in an Intelligent Workload Management System," filed on Mar. 16, 2010, co-pending U.S. patent application Ser. No. 12/727,837, entitled "System and Method for Managing Information Technology Models in an Intelligent Workload Management System," filed on Mar. 19, 2010, co-pending U.S. patent application Ser. No. 12/762,015, entitled "System and Method for Discovery Enrichment in an Intelligent Workload Management System," filed on Apr. 16, 2010, co-pending U.S. patent application Ser. No. 12/900,866, entitled "System and Method for Providing Annotated Service Layer Blueprints in an Intelligent Workload Management System," filed on Oct. 8, 2010, and co-pending U.S. patent application Ser. No. 12/645,114, entitled "System and Method for Controlling Cloud and Virtualized Data Centers in an Intelligent Workload Management System," filed on Dec. 22, 2009, each of which further claim benefit to U.S. Provisional Patent Application Ser. No. 61/264,562, and each of which are hereby further incorporated by reference in entirety.

FIELD OF THE INVENTION

The invention relates to a system and method for providing scorecards to visualize services in an intelligent workload management system, and in particular, to a computing environment having a model-driven, service-oriented architecture for creating collaborative threads to manage workloads, wherein the management threads may converge information for describing services, applications, workloads, in an information technology infrastructure, and further for tuning agility, risk, complexity, cost, and availability for the infrastructure,

BACKGROUND OF THE INVENTION

"Cloud computing" generally refers to a computing environment with dynamically scalable and often virtualized resources, which are typically provided as services over the Internet. For example, cloud computing environments often employ the concept of virtualization as a preferred paradigm for hosting workloads on any appropriate hardware. The cloud computing model has become increasingly viable for many enterprises for various reasons, including that the cloud infrastructure may permit information technology resources to be treated as utilities that can be automatically provisioned on demand, while also limiting the cost of services to actual resource consumption. Moreover, consumers of resources provided in cloud computing environments can leverage technologies that might otherwise be unavailable. Thus, as cloud computing and cloud storage become more pervasive, many enterprises will find that moving data center to cloud providers can yield economies of scale, among other advantages.

However, while much of the information technology industry moves toward cloud computing and virtualization environments, existing systems tend to fall short in adequately addressing concerns relating to managing or controlling workloads and storage in such environments. For example, cloud computing environments are generally designed to support generic business practices, meaning that individuals and organizations typically lack the ability to change many aspects of the platform. Moreover, concerns regarding performance, latency, reliability, and security present significant challenges, as outages and downtime can lead to lost business opportunities and decreased productivity, while the generic platform may present governance, risk, and compliance concerns. In other words, once organizations deploy workloads beyond the boundaries of their data centers, lack of visibility into the computing environment may result in significant management problems.

While these types of problems tend to be pervasive in cloud computing and virtualization environments due to the lack of transparency, existing systems for managing and controlling workloads that are physically deployed and/or locally deployed in home data centers tend to suffer from many similar problems. In particular, information technology has traditionally been managed in silos of automation, which are often disconnected from one another. For example, help desk systems typically involve a customer submitting a trouble ticket to a remedy system, with a human operator then using various tools to address the problem and close the ticket, while monitoring systems that watch the infrastructure to remediate problems may remain isolated from the interaction between the customer and the help desk despite such interaction being relevant to the monitoring system's function.

As such, because existing systems for managing infrastructure workloads operate within distinct silos that typically do not communicate with one another, context that has been exchanged between two entities can often be lost when the workload moves to the next step in the chain. When issues surrounding workload management are considered in the context of business objectives, wherein information technology processes and business issues collectively drive transitions from one silo to another, modern business tends to move at a speed that outpaces information technology's ability to serve business needs. Although emerging trends in virtualization, cloud computing, appliances, and other models for delivering services have the potential to allow information technology to catch up with the speed of business, many businesses lack the knowledge needed to intelligently implement these new technologies.

For example, emerging service delivery models often lead to deployed services being composed and aggregated in new and unexpected ways. In particular, rather than designing and modeling systems from the ground up, new functionality is often generated on-the-fly with complex building blocks that tend to include various services and applications that have traditionally been isolated and stand-alone. As such, even though many emerging service delivery models provide administrators and users with a wider range of information technology choices than have ever before been available, the diversity in technology often compounds business problems and increases the demand for an agile infrastructure. Thus, despite the advantages and promise that new service delivery models can offer businesses, existing systems tend to fall short in providing information technology tools that can inform businesses on how to intelligently implement an information technology infrastructure in a manner that best leverage available technology to suit the particular needs of a business.

SUMMARY OF THE INVENTION

According to one aspect of the invention, a system and method for intelligent workload management may generally provide a computing environment having a fluid architecture, whereby the computing environment may create common threads to manage workloads that converge information relating to user identities and access credentials, provisioned and requested services, and physical and virtual infrastructure resources, among other things. In one implementation, services provided in the computing environment may generally include various aggregated physical and/or virtual resources, while applications may include various aggregated services and workloads may include various compositions of whole services, separate services, and/or sub-services that work together. For example, in response to a user requesting a service that performs a particular function or application, the intelligent workload management system (or alternatively "the workload management system") may create a workload to manage provisioning the user with a tuned appliance configured to perform the particular function or application, whereby the tuned appliance may provide the requested service for the user. To manage the workload, the workload management system may create a resource store that points to a storage location for the appliance, declare a service level agreement and any runtime requirements that constrain deployment for the appliance, obtain a certificate that provides attestation tokens for the user and the appliance, and create a profile that provides an audit trail of actual lifecycle behavior for the appliance (e.g., events and performance metrics relating to the appliance). Thus, workflows created in the computing environment may converge various sources of information within a common thread, which the workload management system may use to manage the workload (e.g., actual metrics for a particular workload can be compared to anticipated metrics for the workload to determine whether various services underlying the workload function as intended).

According to one aspect of the invention, the system and method for intelligent workload management may operate in a model-driven architecture, which may merge information relating to user identities with services that may be running in an information technology infrastructure. As such, the information merged in the model-driven architecture may be referenced to determine specific users or organizational areas within the infrastructure that may be impacted in response to a particular change to the infrastructure model. Thus, whereas information technology has traditionally been managed within disparate silos, where context exchanged between any two entities may be lost at the next step in the chain, the model-driven architecture may track context for information technology workloads from start to finish. As such, tracking context for the information technology workloads may provide audit trails that can then be used to identify a relevant user, application, system, or other entity that can provide assistance with a particular issue. Moreover, in the context of managing workloads for virtualized services, where different users typically have to communicate with one another on-demand, the audit trail that the model-driven architecture enables may track end-to-end workload activities and thereby provide visibility and notice to users, applications, systems, services, or any other suitable entity that may be impacted by the workload.

According to one aspect of the invention, the system and method for intelligent workload management may enable agile and flexible management for an information technology infrastructure, which may enable the infrastructure to move at the speed of modern business. For example, the system and method for intelligent workload management may further operate in a service-oriented architecture unifying various heterogeneous technologies, which may provide businesses with the capability to deploy information technology resources in a manner that can meet business objectives. For example, the service-oriented architecture may provide adaptable, interoperable, and user-friendly information technology tools to manage the infrastructure in a manner that addresses many typical business challenges that information technology organizations face. For example, while the model-driven architecture may employ virtualization features to provide manageable workloads that can move efficiently through the infrastructure, the service-oriented architecture may merge different technologies to provide various coordinated systems that can cooperate to optimally execute portions of an overall orchestrated workload. As such, the model-driven and service-oriented architectures may collectively derive data from the information technology infrastructure, which may inform intelligent information technology choices that meet the needs of businesses and users.

According to one aspect of the invention, the system and method for intelligent workload management may be used to manage workloads created in response to service requests. For example, any suitable user, application, system, or other entities may request a service from the workload management system, wherein the request may include a desired performance level (or service level) for the service, any components or criteria required for the service, comments to provision the service in a certain manner, or any other suitable information for the requested service. In response to receiving the service request, human and/or automated approvers (or service delivery managers) may collaboratively manage the service request and determine whether the service can be provisioned as requested. Furthermore, the approvers may provide feedback on the service provisioning decision, which may create an interactive collaborative "conversation" between requesters, approvers, and other entities in the management thread. In one implementation, various security policies may be built into the model to automatically approve or deny certain requests, wherein the security policies may be dynamically updated in response to handling similar requests (e.g., a request for Bit Torrent storage may be automatically denied because a particular security policy indicates that peer-to-peer file sharing violates a company policy).

According to one aspect of the invention, services provisioned in the workload management system may include any suitable combination of physical infrastructure resources and virtualized infrastructure resources. For example, to provision virtualized services that can abstract underlying physical platforms and share computing resources in a manner that may address many needs for immediacy in business environments, the workload management system may manage physical infrastructure resources and virtualized infrastructure resources to support provisioning virtualized services. Thus, the service-oriented architecture employed in the workload management system may enable management for the physical infrastructure resources (e.g., rack-mounting, configuring, and otherwise physically installing servers, storage resources, and other devices), and may further enable management for the virtualized infrastructure resources (e.g., preconfiguring provisioned services with identity management features, denying, flagging, or auditing service requests from unauthorized entities, etc.). Moreover, the workload management system may be considered a service in that the workload management service may be built dynamically in response to service requests (e.g., because a management infrastructure can introduce computational burdens just as any other resource, limiting the existence of the workload management infrastructure to an on-demand service can free computational resources for other tasks having a greater need for immediacy).

According to one aspect of the invention, to manage collaborative service provisioning in contexts that combine physical and virtualized resources, the workload management system may store a history of interaction between requesters, approvers, and other entities in service provisioning threads, and may further record, log, and save traffic and activity between such entities in the service provisioning threads. As such, various processes that occur during service provisioning may be recorded and injected into a real-time stream that can subsequently be played back, thereby capturing the service provisioning processes as a whole, including any responses that human and/or automated entities may provide during the collaborative process. During processes for collaboratively managing the information technology infrastructure, the workload management system may expose portions of the infrastructure model to entities involved in the management processes. In one implementation, the workload management system may expose "just enough context" to entities involved in the management processes, whereby the involved entities may view the respective portions of the infrastructure model for which such entities have management responsibility (e.g., prior to implementing any particular change to the infrastructure, the workload management system may query the model and determine an impact of the change, notify impacted entities, etc.).

According to one aspect of the invention, virtualized services provisioned in the workload management system may further include injection points for adding and/or removing information from the provisioned services. For example, any particular virtualized service may generally include a layered architecture that includes injection points for inserting "zero residue" management agents that can manage the service and ensure that the service functions correctly. Thus, in one implementation, zero residue management agents may be inserted within virtualized services at build time, run time, or any other suitable point in a lifecycle for the virtualized services, wherein the particular management agents inserted within the virtualized services may depend on a type of management required. For example, the workload management system may analyze a configuration of the service, a lifecycle point for the service, or other suitable information for the service to derive a recipe of the management agents to be injected (e.g., the recipe may depend on a required service level for the service, a current operational state for the infrastructure model, services running in the infrastructure, a type of management required for the running services, etc.).

Other objects and advantages of the invention will be apparent to those skilled in the art based on the following drawings and detailed description.

BRIEF DESCRIPTION OF THE DRAWINGS

FIG. 1A illustrates a block diagram of an exemplary model-driven architecture in a system for intelligent workload management, according to one aspect of the invention.

FIG. 5A illustrates an exemplary service listing scorecard that can be used to visualize and tune services in the intelligent workload management system, according to one aspect of the invention.

FIG. 5B illustrates an exemplary operation index scorecard that can be used to visualize and tune an infrastructure operational state in the intelligent workload management system, according to one aspect of the invention.

FIG. 5C illustrates an exemplary risk heat map scorecard that can be used to visualize and tune risk to coverage ratios in the intelligent workload management system, according to one aspect of the invention.

FIG. 5D illustrates an exemplary service placement scorecard that can be used to visualize and tune service placements in the intelligent workload management system, according to one aspect of the invention.

DETAILED DESCRIPTION

Figure 1B:
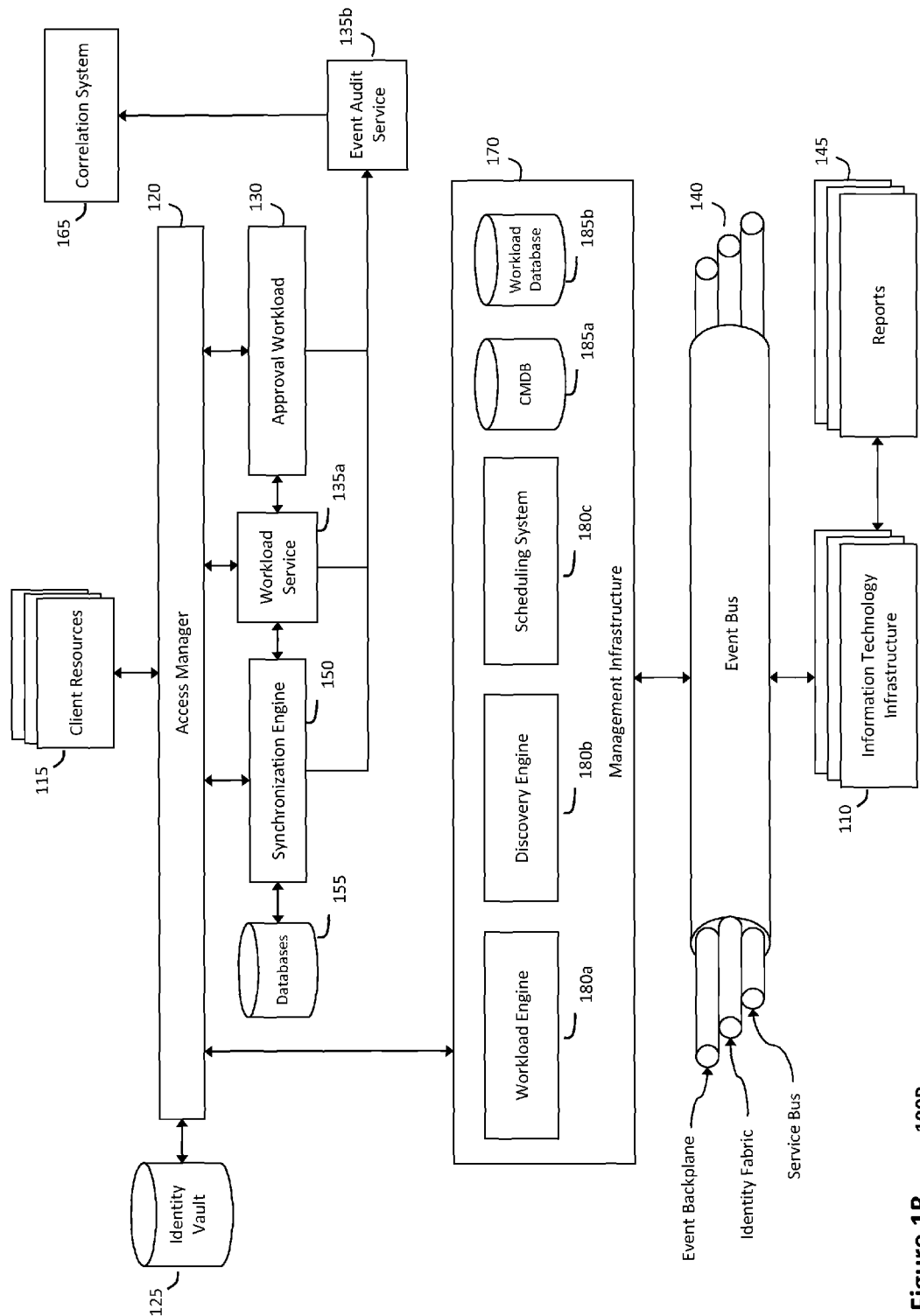
FIG. 1B illustrates a block diagram of an exemplary service-oriented architecture in the system for intelligent workload management, according to one aspect of the invention.

According to one aspect of the invention, FIG. 1A illustrates an exemplary model-driven architecture 100A in a system for intelligent workload management, while FIG. 1B illustrates an exemplary service-oriented architecture 100B in the system for intelligent workload management. In one implementation, the model-driven architecture 100A shown in FIG. 1A and the service-oriented architecture 100B shown in FIG. 1B may include various components that operate in a substantially similar manner to provide the functionality that will be described in further detail herein. Thus, any description provided herein for components having identical reference numerals in FIGS. 1A and 1B will be understood as corresponding to such components in both FIGS. 1A and 1B, whether or not explicitly described.

In one implementation, the model-driven architecture 100A illustrated in FIG. 1A and the service-oriented architecture 100B illustrated in FIG. 1B may provide an agile, responsive, reliable, and interoperable information technology environment, which may address various problems associated with managing an information technology infrastructure 110 (e.g., growing revenues and cutting costs, managing governance, risk, and compliance, reducing times to innovate and deliver products to markets, enforcing security and access controls, managing heterogeneous technologies and information flows, etc.). To that end, the model-driven architecture 100A and the service-oriented architecture 100B may provide a coordinated design for the intelligent workload management system (or alternatively "the workload management system"), wherein the coordinated design may integrate technologies for managing identities, enforcing policies, assuring compliance, managing computing and storage environments, providing orchestrated virtualization, enabling collaboration, and providing architectural agility, among other things. The model-driven architecture 100A and the service-oriented architecture 100B may therefore provide a flexible framework that may enable the workload management system to allocate various resources 114 in the information technology infrastructure 110 in a manner that balances governance, risk, and compliance with capacities for internal and external resources 114. For example, as will be described in further detail herein, the workload management system may operate within the flexible framework that the model-driven architecture 100A and the service-oriented architecture 100B to deliver information technology tools for managing security, performance, availability, and policy objectives for services provisioned in the information technology infrastructure 110.

Identity Management

In one implementation, as noted above, the technologies integrated by the model-driven architecture 100A and the service-oriented architecture 100B may enable managing identities in the information technology infrastructure 110. In particular, managing identities may present an important concern in the context of managing services in the information technology infrastructure 110 because security, performance, availability, policy objectives, and other variables may have different importance for different users, customers, applications, systems, or other resources 114 that operate in the information technology infrastructure 110. As such, the model-driven architecture 100A and the service-oriented architecture 100B may include various components that enable identity management in the information technology infrastructure 110.

For example, in one implementation, the workload management system may include an access manager 120 (e.g., Novell Access Manager), which may communicate with an identity vault 125 and control access to content, applications, services, and other resources 114 in the information technology infrastructure 110. In one implementation, the access manager 120 may enforce various policy declarations to provide authentication services for any suitable component in the information technology infrastructure 110. For example, the identity vault 125 may include various directories that organize user accounts, roles, policies, and other identity information that the access manager 120 can reference to generate authorization decisions. The access manager 120 and the identity vault 125 may further support federated user identities, wherein a user at any particular client resource 115 may submit single sign-on authentication credentials to the access manager 120, which may then control access to any suitable resource 114 in the information technology infrastructure 110 with the single sign-on authentication credentials (e.g., user names, identifiers, passwords, smart cards, biometrics, etc.). Moreover, the identity information stored in the identity vault 125 may be provided to a synchronization engine 150, whereby the synchronization engine 150 may provide interoperable and transportable identity information throughout the architecture (e.g., via an identity fabric within an event bus 140 that manages transport throughout the architecture).

In one implementation, providing the identity information stored in the identity vault 125 to the synchronization engine 150 may form portable identities that correspond to independent digital representations for various users, applications, systems, or other entities that interact with the information technology infrastructure 110. In particular, the identities maintained in the synchronization engine 150 may generally include abstractions that can provide access to authoritative attributes, active roles, and valid policies for entities that the identity abstractions represent. Thus, synchronizing the identity information stored in the identity vault 125 with the synchronization engine 150 may provide independent and scalable digital identities that can be transported across heterogeneous applications, services, networks, or other systems, whereby the workload management system may handle and validate the digital identities in a cooperative, interoperable, and federated manner.

In one implementation, the identities stored in the identity vault 125 and synchronized with the synchronization engine 150 may be customized to define particular attributes and roles that the identities may expose. For example, a user may choose to create one identity that exposes every attribute and role for the user to applications, services, or other systems that reside within organizational boundaries, another identity that limits the attributes and roles exposed to certain service providers outside the organizational boundaries, and another identity that provides complete anonymity in certain contexts. The identities maintained in the synchronization engine 150 may therefore provide awareness over any authentication criteria that may be required to enable communication and collaboration between entities that interact with the workload management system. For example, the synchronization engine 150 may include a service that can enforce policies controlling whether certain information stored in the identity vault 125 can be shared (e.g., through the access manager 120 or other information technology tools that can manage and customize identities).

In one implementation, the workload management system may further manage identities in a manner that enables infrastructure workloads to function across organizational boundaries, wherein identities for various users, applications, services, and other resources 114 involved in infrastructure workloads may be managed with role aggregation policies and logic that can support federated authentication, authorization, and attribute services. For example, in one implementation, the access manager 120, the identity vault 125, and the synchronization engine 150 may manage identity services externally to applications, services, and other resources 114 that consume the identities, which may enable the workload management system to control access to services for multiple applications using consistent identity interfaces. In particular, the access manager 120, the identity vault 125, and the synchronization engine 150 may define standard interfaces for managing the identity services, which may include authentication services, push authorization services (e.g., tokens, claims, assertions, etc.), pull authorization services (e.g., requests, queries, etc.), push attribute services (e.g., updates), pull attribute services (e.g., queries), and audit services.

As such, in one implementation, the workload management system may employ the identity services provided in the model-driven architecture 100A and the service-oriented architecture 100B to apply policies for representing and controlling roles for multiple identities within any particular session that occurs in the information technology infrastructure 110. For example, in response to a session that includes a user logging into a client machine 115 and invoking a backup service, the workload management system may manage the session with multiple identities that encompass the user, the backup service, and the client machine 115. The workload management system may further determine that the identity for the client machine 115 represents an unsecured machine that resides outside an organizational firewall, which may result in the workload management system retrieving a policy from the identity vault 125 and/or the synchronization engine 150 and applying the policy to the session (e.g., the policy may dynamically prevent the machine 115 and the user from being active in the same session). Thus, the workload management system may manage multiple identities that may be involved in any particular service request to control and secure access to applications, services, and other resources 114 in the information technology infrastructure 110.

In one implementation, the model-driven architecture 100A and the service-oriented architecture 100B may further provide identity services for delegating rights in delegation chains that may involve various different levels of identities. In particular, any particular user may have various roles, attributes, or other identities that define various rights for the user. As such, in one implementation, the rights delegation identity service may enable the user to delegate a time-bounded subset of such rights to a particular service, wherein the service can then make requests to other services on behalf of the user during the delegated time. For example, a user may delegate rights to a backup service that permits the backup service to read a portion of a clustered file system 195 during a particular time interval (e.g., 2 a.m. to 3 a.m.). In response to the file system 195 receiving the read request from the backup service, the identity services may enable the file system 195 to audit identities for the backup service and the user, and further to constrain read permissions within the file system 195 based on the relevant rights defined by the identities for the backup service for the user.

In one implementation, the model-driven architecture 100A and the service-oriented architecture 100B may further provide identity services for defining relative roles, wherein relative roles may be defined where a principal user, application, service, or other entity can only assume a particular role for a particular action when a target of the action has a particular set of identities. For example, a user having a doctor role may only assume a doctor-of-record relative role if an identity for a target of the doctor-of-record action refers to one of the user's patients. In another example, applications may request controlled access to information about an identity for a certain user, wherein the application may retrieve the requested information directly from the access-controlled identity for the user. In particular, the workload management system may determine the information requested by the application and create a workload that indicates to the user the information requested by the application and any action that the application may initiate with the requested information. The user may then make an informed choice about whether to grant the application access to the requested information. Thus, having identities to enable applications may eliminate a need for application-specific data storage or having the application access separate a directory service or another identity information source.

Thus, in the model-driven architecture 100A and the service-oriented architecture 100B, the identity management services may create crafted identities combined from various different types of identity information for various users, applications, services, systems, or other information technology resources 114. In one implementation, while the identity information may generally be stored and maintained in the identity vault 125, the identity information can be composed and transformed through the access manager 120 and/or the synchronization engine 150, with the resulting identity information providing authoritative statements for represented entities that span multiple authentication domains within and/or beyond boundaries for the information technology infrastructure 110. For example, an identity for a user may be encapsulated within a token that masks any underlying credential authentication, identity federation, and attribute attestation. Moreover, in one implementation, the identity services may further support identities that outlive entities that the identities represent and multiple identity subsets within a particular identity domain or across multiple identity domains. As such, the identity services provided in the model-driven architecture 100A and the service-oriented architecture 100B may include various forms of authentication, identifier mapping, token transformation, identity attribute management, and identity relationship mapping.

Policy Enforcement

In one implementation, as noted above, the technologies integrated by the model-driven architecture 100A and the service-oriented architecture 100B may enable enforcing policies in the information technology infrastructure 110. In particular, enforcing policies may present an important concern in the context of managing services in the information technology infrastructure 110 because policies may be driven from multiple hierarchies and depend on operational, legislative, and organizational requirements that can overlap, contradict, and/or override each other. As such, the model-driven architecture 100A and the service-oriented architecture 100B may include various components for defining policies in standardized languages that can be translated, merged, split, or otherwise unified as needed. To that end, the workload management system may have multiple policy decision points and policy definition services for consistently managing and enforcing policies in the information technology infrastructure 110

As such, in one implementation, the model-driven architecture 100A and the service-oriented architecture 100B may provide standard policy languages and service interfaces that enable the workload management system to make consistent decisions based on flexible user needs. In particular, any suitable resource 114 (including workloads and computational infrastructure) may be provided with access to standardized instrumentation that provides knowledge regarding information that may be available, desired, or allowed in the workload management system. In one implementation, the workload management system may invoke various cooperating policy services to determine suitable physical resources 114a (e.g., physical servers, hardware devices, etc.), virtualized resources 114b (e.g., virtual machine images, virtualized servers, etc.), configuration resources 114c (e.g., management agents, translation services, etc.), storage resources (e.g., the clustered file system 195, one or more databases 155, etc.), or other resources 114 for a particular workload. For example, the synchronization engine 150 may dynamically retrieve various policies stored in the databases 155, and an event audit service 135b may then evaluate the policies maintained in the synchronization engine 150 independently from services that subsequently enforce policy decisions (e.g., the event audit service 135b may determine whether the policies permit access to certain information for a particular application and the application may then enforce the policy determination).

In one implementation, separating policy evaluation within the event audit service 135b from policy enforcement within consuming services may enable the workload management system to access the consuming services and manage policy-based control for the service in an independent and simultaneous manner. The event audit service 135b may include a standardized policy definition service that can be used to define policies that span multiple separate application and management domains. For example, in one implementation, the policy definition service may create, manage, translate, and/or process policies separately from other service administration domains and interfaces. As such, the policy definition service may provide interoperability for the separate domains and interfaces, and may further enable compliance services that may be provided in a correlation system 165 and remediation services that may be provided in a workload service 135a.

In one implementation, to ensure correct and effective policy decisions, the policy definition service provided within the event audit service 135b may be configured to obtain data relating to a current state and configuration for resources 114 managed in the infrastructure 110 in addition to data relating to dependencies or other interactions between the managed resources 114. For example, a management infrastructure 170 may include a discovery engine 180b that dynamically monitors various events that the infrastructure 110 generates and pushes onto the event bus 140, which may include an event backplane for transporting the events. Moreover, the discovery engine 180b may query the infrastructure 110 to determine relationships and dependencies among users, applications, services, and other resources 114 in the infrastructure 110. As such, the discovery engine 180b may monitor the event bus 140 to obtain the events generated in the infrastructure 110 and synchronize the events to the synchronization engine 150, and may further synchronize information relating to the relationships and dependencies identified in the infrastructure 110 to the synchronization engine 150. In one implementation, the event audit service 135b may then evaluate any events, resource relationships, resource dependencies, or other information describing the operational state and the configuration state of the infrastructure 110 in view of any relevant policies and subsequently provide any such policy evaluations to requesting entities.

In one implementation, the policy definition service may include standard interfaces for defining policies in terms of requirements, controls, and rules. For example, the requirements may generally be expressed in natural language in order to describe permitted functionality, prohibited functionality, desirable functionality, and undesirable functionality, among other things (e.g., the event audit service 135b may capture legislative regulations, business objectives, best practices, or other policy-based requirements expressed in natural language). The controls may generally associate the requirements to particular objects that may be managed in the workload management system, such as individual users, groups of users, physical resources 114a, virtualized resources 114b, or any other suitable object or resource 114 in the infrastructure 110. In one implementation, the policy definition service may further define types for the controls. For example, the type may include an authorization type that associates an identity with a particular resource 114 and action (e.g., for certain identities, authorizing or denying access to a system or a file, permission to alter or deploy a policy, etc.), or the type may include an obligation type that mandates a particular action for an identity.

Thus, in one implementation, translating requirements into controls may partition the requirements into multiple controls that may define policies for a particular group of objects. Furthermore, rules may apply certain controls to particular resources 114, wherein rules may represent concrete policy definitions. For example, the rules may be translated directly into a machine-readable and machine-executable format that information technology staff may handle and that the event audit service 135b may evaluate in order to manage policies. In one implementation, the rules may be captured and expressed in any suitable domain specific language, wherein the domain specific language may provide a consistent addressing scheme and data model to instrument policies across multiple domains. For example, a definitive software library 190 may include one or more standardized policy libraries for translating between potentially disparate policy implementations, which may enable the event audit service 135b to provide federated policies interoperable across multiple different domains. As such, the rules that represent the policy definitions may include identifiers for an originating policy implementation, which the policy definition service may then map to the controls that the rules enforce and to the domain specific policy language used in the workload management system (e.g., through the definitive software library 190).

Compliance Assurance

In one implementation, as noted above, the technologies integrated by the model-driven architecture 100A and the service-oriented architecture 100B may enable monitoring for compliance assurances in the information technology infrastructure 110. In particular, compliance assurance may present an important concern in the context of managing services in the information technology infrastructure 110 because policy enforcement encompasses issues beyond location, access rights, or other contextual information within the infrastructure (e.g., due to increasing mobility in computing environments). As such, the model-driven architecture 100A and the service-oriented architecture 100B may define metadata that bounds data to characteristics of data. To that end, the workload management system may employ a standard metadata format to provide interoperability between policies from multiple organizations to enable the policies to cooperate with one another and provide policy-based service control. For example, certain infrastructure workloads may execute under multiple constraints defined by users, the infrastructure 110, sponsoring organizations, or other entities, wherein compliance assurance may provide users with certification that the workloads were properly assigned and executed according to the constraints. In another example, sponsoring organizations and governing bodies may define control policies that constrain workloads, wherein compliance assurance in this context may include ensuring that only authorized workloads have been executed against approved resources 114.

As such, in one implementation, the model-driven architecture 100A and the service-oriented architecture 100B may provide preventative compliance assurance through a compliance management service that supports remediation in addition to monitoring and reporting. For example, when workloads move from data centers internal to the infrastructure 110 into third party processing centers, cloud computing environments, or other environments having reusable computing resource pools where services can be relocated, the workload management system may generate compliance reports 145 that indicate whether any constraints defined for the workloads have been satisfied (e.g., that authorized entities perform the correct work in the correct manner, as defined within the workloads). Thus, compliance may generally be defined to include measuring and reporting on whether certain policies effectively ensure confidentiality and availability for information within workloads, wherein the resulting compliance reports 145 may describe an entire process flow that encompasses policy definition, relationships between configurations and activities that do or do not comply with the defined policies, and identities of users, applications, services, systems, or other resources 114 involved in the process flow.

In one implementation, the workload management system may provide the compliance management service for workloads having specifications defined by users, and further for workloads having specifications defined by organizations. For example, users may generally define various specifications to identify operational constraints and desired outcomes for workloads that the users create, wherein the compliance management service may certify to the users whether or not the operational constraints and desired outcomes have been correctly implemented. With respect to organizational workloads, organizations may define various specifications identifying operational constraints and desired outcomes for ensuring that workloads comply with governmental regulations, corporate best practices, contracts, laws, and internal codes of conduct. Thus, the compliance management service may integrate the identity management services and the policy definition service described above to provide the workload management system with control over configurations, compliance event coverage, and remediation services in the information technology infrastructure 110.

In one implementation, the compliance management service may operate within a workload engine 180a provided within the management infrastructure 170 and/or a workload service 135b in communication with the synchronization engine 150. The workload engine 180a and/or the workload service 135b may therefore execute the compliance management service to measure and report on whether workloads comply with relevant policies, and further to remediate any non-compliant workloads. For example, the compliance management service may use the integrated identity management services to measure and report on users, applications, services, systems, or other resources 114 that may be performing operational activity that occurs in the information technology infrastructure 110. In particular, the compliance management service may interact with the access manager 120, the identity vault 125, the synchronization engine 150, or any other suitable source that provides federated identity information to retrieve identities for the entities performing the operational activity, validate the identities, determine relationships between the identities, and otherwise map the identities to the operational activity. For example, in one implementation, the correlation system 165 may provide analytic services to process audit trails for any suitable resource 114 (e.g., correlating the audit trails and then mapping certain activities to identities for resources 114 involved in the activities). Furthermore, in response to the correlation system 165 processing the audit trails and determining that certain policies have been violated, the correlation system 165 may invoke one or more automated remediation workloads to initiate appropriate action for addressing the policy violations.

In one implementation, the compliance management service may further use the integrated policy definition service to monitor and report on the operational activity that occurs in the information technology infrastructure 110 and any policy evaluation determinations that the event audit service 135b generates through the policy definition service. For example, in one implementation, the workload engine 180a and/or the workload service 135b may retrieve information from a configuration management database 185a or other databases 155 that provide federated configuration information for managing the resources 114 in the information technology infrastructure 110. The workload engine 180a and/or the workload service 135b may therefore execute the compliance management service to perform scheduled and multi-step compliance processing, wherein the compliance processing may include correlating operational activities with identities and evaluating policies that may span various different policy domains in order to govern the information technology infrastructure 110. To that end, the model-driven architecture 100A and the service-oriented architecture 100B may provide various compliance management models may be used in the compliance management service.

In one implementation, the compliance management models may include a wrapped compliance management model that manages resources 114 lacking internal awareness over policy-based controls. The compliance management service may augment the resources 114 managed in the wrapped compliance model with one or more policy decision points and/or policy enforcement points that reside externally to the managed resources 114 (e.g., the event audit service 135b). For example, the policy decision points and/or the policy enforcement points may intercept any requests directed to the resources 114 managed in the wrapped compliance model, generate policy decisions that indicate whether the resources 114 can properly perform the requests, and then enforce the policy decisions (e.g., forwarding the requests to the resources 114 in response to determining that the resources 114 can properly perform the requests, denying the requests in response to determining that the resources 114 can properly perform the requests, etc.). Thus, because the resources 114 managed in the wrapped compliance model generally perform any requests that the resources 114 receive without considering policy-based controls or compliance issues, the event audit service 135b may further execute the compliance management service to wrap, coordinate, and synthesize an audit trail that includes data obtained from the managed resources 114 and the wrapping policy definition service.

In one implementation, the compliance management models may include a delegated compliance management model to manage resources 114 that implement a policy enforcement point and reference an external policy decision point, wherein the resources 114 managed in the delegated compliance management model may have limited internal awareness over policy-based controls. As such, in one implementation, the compliance management service may interleave policy decisions or other control operations generated by the external policy decision point with the internally implemented policy enforcement point to provide compliance assurance for the resources 114 managed in the delegated compliance management model. The delegated compliance management model may therefore represent a hybrid compliance model, which may apply to any suitable service that simultaneously anticipates compliance instrumentation but lacks internal policy control abstractions (e.g., the internally implemented policy enforcement point may anticipate the compliance instrumentation, while the externally referenced policy decision point has the relevant policy control abstractions). Thus, in the delegated compliance management model, the compliance management service may have fewer objects to coordinate than in the wrapped compliance management model, but the event audit service 135b may nonetheless execute the compliance management service to coordinate and synthesize an audit trail that includes data obtained from the managed resources 114 and the delegated external policy decision point.

In one implementation, the compliance management models may include an embedded compliance management model that manages resources 114 that internally implement policy enforcement points and policy decision points, wherein the resources 114 managed in the embedded compliance management model may have full internal awareness over policy-based controls. As such, in one implementation, the resources 114 managed in the embedded compliance management model may employ the internally implemented policy enforcement points and policy decision points to instrument any service and control operations for requests directed to the resources 114. In one implementation, to provide flexible compliance assurance, resources 114 managed in the embedded compliance management model may expose configuration or customization options via an externalized policy administration point. Thus, the embedded compliance management model may provide an integrated and effective audit trail for compliance assurance, which may often leave the compliance management service free to perform other compliance assurance processes.

Accordingly, in one implementation, the compliance management service may obtain information for any resource 114 managed in the information technology infrastructure 110 from the configuration management database 185a or other databases 155 that include a federated namespace for the managed resources 114, configurations for the managed resources 114, and relationships among the managed resources 114. In addition, the compliance management service may reference the configuration management database 185a or other the databases 155 to arbitrate configuration management in the infrastructure 110 and record previous configurations histories for the resources 114 in the configuration management database 185a or other databases 155. As such, the compliance management service may generally maintain information relating to identities, configurations, and relationships for the managed resources 114, which may provide a comparison context for analyzing subsequent requests to change the infrastructure 110 and identifying information technology services that the requested changes may impact.

Computing and Storage Environments

In one implementation, as noted above, the technologies integrated by the model-driven architecture 100A and the service-oriented architecture 100B may include managing computing and storage environments that support services in the infrastructure 110. In particular, in one implementation, the computing and storage environments used to support services in the infrastructure 110 may employ Linux operating environments, which may generally include an operating system distribution with a Linux kernel and various open source packages (e.g., gcc, glibc, etc.) that collectively provide the Linux operating environments. In one implementation, the Linux operating environments may generally provide a partitioned distribution model for managing the computing and storage environments employed in the workload management system. Further, in one implementation, a particular Linux distribution may be bundled for operating environments pre-installed in the workload management system (e.g., openSUSE, SUSE Linux Enterprise, etc.), which may enable vendors of physical hardware resources 114a to support every operating system that the vendors' customers employ without overhead that may introduced with multiple pre-installed operating environment choices.

In one implementation, the partitioned distribution model may partition the Linux operating environments into a physical hardware distribution (often referred to as a "pDistro"), which may include physical resources 114a that run over hardware to provide a physical hosting environment for virtual machines 114b. For example, in one implementation, the physical hardware distribution may include the Linux kernel and various hypervisor technologies that can run the virtual machines 114b over the underlying physical hosting environment, wherein the physical hardware distribution may be certified for existing and future-developed hardware environments to enable the workload management system to support future advances in the Linux kernel and/or hypervisor technologies. Alternatively (or additionally), the workload management system may release the physical hardware distribution in a full Linux distribution version to provide users with the ability to take advantage of future advances in technologies at a faster release cycle.

In one implementation, the partitioned distribution model may further partition the Linux operating environments into a virtual software distribution (often referred to as a "vDistro"), which may include virtual machines 114b deployed for specific applications or services that run, enable, and otherwise support workloads. More particularly, any particular virtual software distribution may generally include one or more Linux package or pattern deployments, whereby the virtual machines 114b may include virtual machines images with "just enough operating system" (JeOS) to support the package or pattern deployments needed to run the applications or services for the workloads. In one implementation, the virtual software distribution may include a particular Linux product (e.g., SUSE Linux Enterprise Server) bundled with hardware agnostic virtual drivers, which may provide configuration resources 114c for tuning virtualized resources 114b for optimized performance.

In one implementation, the particular virtual software distribution may be certified for governmental security requirements and for certain application vendors, which may enable the workload management system to update any physical resources 114a in the physical hardware distribution underlying the virtual software distribution without compromising support contracts with such vendors. In particular, in response to future changes in technology that may improve support for Linux operating environments, resulting improvements may occur in techniques for building and deploying Linux operating environments. Thus, where many application vendors currently tend to only provide support for certain Linux applications that run in certain Linux versions, the workload management system may enable support for any particular Linux application or version, which may drive Linux integration and adoption across the information technology infrastructure 110. In one implementation, for example, the workload management system may employ Linux applications and distributions created using a build system that enables any suitable application to be built and tested on different versions of Linux distributions (e.g., an openSUSE Build Service, SUSE Studio, etc.). For example, in response to receiving a request that includes unique specifications for a particular Linux application, the workload management system may notify distribution developers to include such specifications in the application, with the specifications then being made available to other application developers.

Thus, in one implementation, the Linux build system employed in the workload management system may enable distribution engineers and developers to detect whether changes to subsequent application releases conflict with or otherwise break existing applications. In particular, changes in systems, compiler versions, dependent libraries, or other resources 114 may cause errors in the subsequent application releases, wherein commonly employing the Linux build system throughout the workload management system may provide standardized application support. For example, in one implementation, the workload management system may employ certified implementations of the Linux Standard Base (LSB), which may enable independent software vendors (ISVs) to verify compliance, and may further provide various support services that can provide policy-based automated remediation for the Linux operating environments through the LSB Open Cluster Framework (OCF).

In one implementation, the Linux operating environments in the workload management system may provide engines that support orchestrated virtualization, collaboration, and architectural agility, as will be described in greater detail below. Further, to manage identities, enforce policies, and assure compliance, the Linux operating environments may include a "syslog" infrastructure that coordinate and manages various internal auditing requirements, while the workload management system may further provide an audit agent to augment the internal auditing capabilities that the "syslog" infrastructure provides (e.g., the audit agent may operate within the event audit service 135b to uniformly manage the Linux kernel, the identity services, the policy services, and the compliance services across the workload management system). For example, in one implementation, partitioning the monolithic Linux distribution within a multiple layer model that includes physical hardware distributions and virtual software distributions may enable each layer of the operating system to be developed, delivered, and supported at different schedules. In one implementation, a scheduling system 180c may coordinate such development, delivery, and support in a manner that permits dynamic changes to the physical resources 114a in the infrastructure 110, which provide stability and predictability for the infrastructure 110.

In one implementation, partitioning the Linux operating environments into physical hardware distributions and virtual software distributions may further enable the workload management system to run workloads in computing and storage environments that may not necessarily be co-located or directly connected to physical storage systems that contain persistent data. For example, the workload management system may support various interoperable and standardized protocols that provide communication channels between users, applications, services, and a scalable replicated storage system, such as the clustered file system 195 illustrated in FIG. 1A, wherein such protocols may provide authorized access between various components at any suitable layer within the storage system.

In one implementation, the clustered file system 195 may generally include various block storage devices, each of which may host various different file systems. In one implementation, the workload management system may provide various storage replication and version management services for the clustered file system 195, wherein the various block storage devices in the clustered file system 195 may be organized in a hierarchical stack, which may enable the workload management system to separate the clustered file system 195 from operating systems and collaborative workloads. As such, the storage replication and version management services may enable applications and storage services to run in cloud computing environments located remotely from client resources 115.

In one implementation, various access protocols may provide communication channels that enable secure physical and logical distributions between subsystem layers in the clustered file system 195 (e.g., a Coherent Remote File System protocol, a Dynamic Storage Technology protocol, which may provide a file system-to-file system protocol that can place a particular file in one of various different file systems based on various policies, or other suitable protocols). Furthermore, traditional protocols for access files from a client resource 115 (e.g., HTTP, NCP, AFP, NFS, etc.) may be written to file system specific interfaces defined in the definitive software library 190. As such, the definitive software library 190 may provide mappings between authorization and semantic models associated with the access protocols and similar elements of the clustered file system 195, wherein the mappings may be dynamically modified to handle any new protocols that support cross-device replication, device snapshots, block-level duplication, data transfer, and/or services for managing identities, policies, and compliance.

As such, the storage replication and version management services may enable users to create workloads that define identity and policy-based storage requirements, wherein team members identities may be used to dynamically modify the team members and any access rights defined for the team members (e.g., new team members may be added to a "write access" group, users that leave the team may be moved to a "read access" group or removed from the group, policies that enforce higher compliance levels for Sarbanes-Oxley may be added in response to an executive user joining the team, etc.). For example, a user that heads a distributed cross-department team developing a new product may define various members for the team and request permission for self-defined access levels for the team members (e.g., to enable the team members to individually specify a storage amount, redundancy level, and bandwidth to allocate). The workload management system may then provide fine grained access control for a dynamic local storage cache, which may move data stored in the in the clustered file system 195 to a local storage for a client resource 115 that accesses the data (i.e., causing the data to appear local despite being persistently managed in the clustered file system 195 remotely from the client resource 115). As such, individual users may then use information technology tools define for local area networks to access and update the data, wherein the replication and version management services may further enable the individual users to capture consistent snapshots that include a state of the data across various e-mail systems, databases 155, file systems 195, cloud storage environments, or other storage devices.

In one implementation, the storage replication and version management services may further enable active data migration and auditing for migrated data. For example, policies or compliance issues may require data to be maintained for a longer lifecycle than hardware and storage systems, wherein the workload management system may actively migrate certain data to long-term hardware or an immutable vault in the clustered file system 195 to address such policies or compliance issues. Furthermore, identity-based management for the data stored in the clustered file system 195 may enable the workload management system to control, track, and otherwise audit ownership and access to the data, and the workload management system may further classify and tag the data stored in the clustered file system 195 to manage the data stored therein (e.g., the data may be classified and tagged to segregate short-term data from long-term data, maintain frequently used data on faster storage systems, provide a content-addressed mechanism for efficiently searching potentially large amounts of data, etc.). Thus, the workload management system may use the storage replication and version management services to generate detailed reports 145 for the data managed in the clustered file system.

In one implementation, the storage replication and version management services may further provide replication services at a file level, which may enable the workload management system to control a location, an identity, and a replication technique (e.g., block-level versus byte-level) for each file in the clustered file system 195. In addition, the storage replication and version management services may further enable the workload management system to manage storage costs and energy consumption (e.g., by controlling a number of copies created for any particular file, a storage medium used to store such copies, a storage location used to store such copies, etc.). Thus, integrating federated identities managed in the identity vault 125 with federated policy definition services may enable the workload management system to manage the clustered file system 195 without synchronizing or otherwise copying every identity with separate identity stores associated with different storage subsystems.

Orchestrated Virtualization

In one implementation, as noted above, the technologies integrated by the model-driven architecture 100A and the service-oriented architecture 100B may provide orchestrated virtualization for managing services provided in the information technology infrastructure 110. In particular, virtualization generally ensures that a machine runs at optimal utilization by allowing services to run anywhere, regardless of requirements or limitations that underlying platforms or operating systems may have. Thus, the workload management system may define standardized partitions that control whether certain portions of the operating system execute over hardware provided in a hosting environment, or inside virtual machines 114b that decouple applications and services from the hardware on which the virtual machines 114b have been deployed. The workload management system may further employ a standardized image for the virtual machines 114b, provide metadata wrappers for encapsulating the virtual machines 114b, and provide various tools for managing the virtual machines 114b (e.g., "zero residue" management agents that can patch and update running instances of virtual machines 114b stored in the clustered file system 195, databases 155, or other repositories).

In one implementation, the virtualized services provided in the workload management system may simplify processes for developing and deploying applications, which may enable optimal utilization of physical resources 114a in the infrastructure. Furthermore, virtualization may be used to certify the Linux operating environments employed in the infrastructure 110 for any suitable platform that include various physical resources 114a. In particular, as described in further detail above, the workload management system may partition the Linux operating environments into a multiple-layer distribution that includes a physical distribution and a virtual distribution, wherein the physical distribution may represent a lower-level interface to physical resources 114a that host virtual machines 114b, while the virtual distribution may represent any applications or services hosted on the virtual machines 114b.

For example, in one implementation, the physical distribution may include a minimally functional kernel that bundles various base drivers and/or independent hardware vendor drivers matched to the physical resources 114a that host the virtual machines 114b. In one implementation, the physical distribution may further include a pluggable hypervisor that enables multiple operating systems to run concurrently over the hosting physical resources 114a, a minimal number of software packages that provide core functionality for the physical distribution, and one or more of the zero residue management agents that can manage any virtualized resources 114b that may be hosted on the physical resources 114a. As such, in response to any particular request to install a physical distribution, package selections available to the workload management system may include packages for the kernel, the hypervisor, the appropriate drivers, and the management agents that may be needed to support brands or classes of the underlying physical resources 114a.

Furthermore, in one implementation, the virtual distribution may include a tuned appliance, which may generally encapsulate an operating system and other data that supports a particular application. In addition, the virtual distribution may further include a workload profile encapsulating various profiles for certifying the appliance with attestation tokens (e.g., profiles for resources 114, applications, service level agreements, inventories, cost, compliance, etc.). Thus, the virtual distribution may be neutral with respect to the physical resources 114a included in the physical distribution, wherein the virtual distribution may be managed independently from any physical drivers and applications hosted by a kernel for the virtual distribution (e.g., upgrades for the kernels and physical device drivers used in the physical distributions may be managed independently from security patches or other management for the kernels and applications used in the virtual distributions). Thus, partitioning the physical distributions from the virtual distributions may remove requirements for particular physical resources 114a and preserve records for data that may require a specific application running on a specific operating system.

In one implementation, from a business perspective, the workload management system may secure the virtualized resources 114b in a similar manner as applications deployed on the physical resources 114a. For example, the workload management system may employ any access controls, packet filtering, or other techniques used to secure the physical resources 114a to enforce containment and otherwise secure the virtualized resources 114b, wherein the virtualized resources 114b may preserve benefits provided by running a single application on a single physical server 114a while further enabling consolidation and fluid allocation of the physical resources 114a. Furthermore, the workload management system may include various information technology tools that can be used to determine whether new physical resources 114a may be needed to support new services, deploy new virtual machines 114b, and establish new virtual teams that include various collaborating entities.

In one implementation, the information technology tools may include a trending tool that indicate maximum and minimum utilizations for the physical resources 114a, which may indicate when new physical resources 114a may be needed. For example, changes to virtual teams, different types of content, changes in visibility, or other trends for the virtualized resources 114b may cause changes in the infrastructure 110, such as compliance, storage, and fault tolerance obligations, wherein the workload management system may detect such changes and automatically react to intelligently manage that the resources 114 in the infrastructure 110. In one implementation, the information technology tools may further include a compliance tool providing a compliance envelope for applications running or services provided within any suitable virtual machine 114b. More particularly, the compliance envelope may save a current state of the virtual machine 114b at any suitable time and then push an updated version of the current state to the infrastructure 110, whereby the workload management system may determine whether the current state of the virtual machine 114b complies with any policies that may have been defined for the virtual machine 114b. For example, the workload management system may support deploying virtual machines 114b in demilitarized zones, cloud computing environments, or other data centers that may be remote from the infrastructure 110, wherein the compliance envelope may provide a security wrapping to safely move such virtual machines 114b and ensure that only entities with approved identities can access the virtual machines 114b.

Thus, from an architectural perspective, the virtualized resources 114b may enable the workload management system to manage development and deployment for services and applications provisioned in the infrastructure 110. For example, rather than dynamically provisioning physical resources 114a to deal with transient peaks in load and availability on a per-service basis, which may result in underutilized physical resources 114a, the workload management system may host multiple virtual machines 114b on one physical machine 114a to optimize utilization levels for the physical resources 114a, which may dynamically provisioned physical resources 114a that enable mobility for services hosted in the virtual machines 114b. Thus, in one implementation, mobile services may enable the workload management system to implement live migration for services that planned maintenance events may impact without adversely affecting an availability of such services, while the workload management system may implement clustering or other availability strategies to address unplanned events, such as hardware or software failures.

In one implementation, the workload management system may further provide various containers to manage the virtual machines 114b, wherein the containers may include a security container, an application container, a service level agreement container, or other suitable containers. The security container may generally provide hardware-enforced isolation and protection boundaries for various virtual machines 114b hosted on a physical resource 114a and the hypervisor hosting the virtual machines 114b. In one implementation, the hardware-enforced isolation and protection boundaries may be coupled with a closed management domain to provide a secure model for deploying the virtual machines 114b (e.g., one or more security labels can be assigned to any particular virtual machine 114b to contain viruses or other vulnerabilities within the particular virtual machine 114b). Furthermore, in the context of tuned appliances, wherein one virtual machine 114b hosts one service that supports one particular application, the application container may package the service within a particular virtual machine image 114b. As such, the virtual machine image 114b may include a kernel and a runtime environment optimally configured and tuned for the hosted service. Similarly, the service level agreement container may dynamically monitor, meter, and allocate resources 114 to provide quality of service guarantees on a per-virtual machine 114b basis in a manner transparent to the virtual machine kernel 114b.

In one implementation, the various containers used to manage the virtual machines 114b may further provide predictable and custom runtime environments for virtual machines 114b. In particular, the workload management system may embed prioritization schemes within portions of an operating system stack associated with a virtual machine 114b that may adversely impact throughput in the operating system. For example, unbounded priority inversion may arise in response to a low-priority task holding a kernel lock and thereby blocking a high-priority task, resulting in an unbounded latency for the high-priority task. As such, in one implementation, the prioritization schemes may embed a deadline processor scheduler in the hypervisor of the virtual machine 114b and build admission control mechanisms into the operating system stack, which may enable the workload management system to distribute loads across different virtual machine 114b and support predictable computing. In addition, the workload management system may decompose kernels and operating systems for virtual machines 114b to provide custom runtime environments. For example, in the context of a typical virtual machine 114b, an "unprivileged guest" virtual machine 114b may hand off processing to a "helper" virtual machine 114b at a device driver level. Thus, to support server-class applications that may depend on having a portable runtime environment, the workload management system may use the decomposed kernels and operating systems to dynamically implement an operating system for a particular virtual machine 114b at runtime (e.g., the dynamically implemented operating system may represent a portable runtime that can provide a kernel for a virtual machine 114b that hosts a service running a server-class application, which may be customized as a runtime environment specific to that service and application).

In one implementation, the workload management system may further employ different virtualization technologies in different operating environments. For example, in one implementation, the workload management system may implement Type 1 hypervisors for virtualized server resources 114b and Type 2 hypervisors for virtualized workstation, desktop, or other client resources 115. In particular, Type 1 hypervisors generally control and virtualize underlying physical resources 114a to enable hosting guest operating systems over the physical resources 114a (e.g., providing coarse-level scheduling to partition the physical resources 114a in a manner that can meet quality of service requirements for each of the guest operating systems hosted on the physical resources 114a). Thus, the workload management system may implement Type 1 hypervisors for virtualized server resources 114b to leverage performance and fault isolation features that such hypervisors provide. In contrast, Type 2 hypervisors generally include use a host operating system as the hypervisor, which use Linux schedulers to allocate resources 114 to guest operating systems hosted on the hypervisor. In Type 2 hypervisor architectures, such as the VMware GSX Server, Microsoft Virtual PC, and Linux KVM, hosted virtual machines 114b appear as a process similar to any other hosted process. Thus, because workstations, desktops, and other client resources 115 may include hardware that may or may not support virtualization, the workload management system may provide centralized desktop management and provisioning using Type 2 hypervisors. For example, the workload management system may manage and maintain desktop environments as virtual appliances 114b hosted in the infrastructure 110 and then remotely deliver the desktop environments to remote client resources 115 (e.g., in response to authenticating an end user at a particular client resource 115, the virtual appliance 114b carrying the appropriate desktop environment may be delivered for hosting to the client resource 115, and the client resource 115 may transfer persistent states for the desktop environment to the infrastructure 110 to ensure that the client resource 115 remains stateless).

In one implementation, orchestrated virtualization may generally refer to implementing automated policy-based controls for virtualized services. For example, an orchestrated data center may ensure compliance with quality of service agreements for particular groups of users, applications, or activities that occur in the information technology infrastructure 110. The workload management system may therefore provide a policy-based orchestration service to manage virtualized resources 114b, wherein the orchestration service may gather correct workload metrics without compromising performance in cloud computing environments or other emerging service delivery models. For example, workloads that users define may be executed using coordinated sets of virtual machines 114b embedding different application-specific operating systems, wherein the workload management system may provision and de-provision the virtual machines 114b to meet requirements defined in the workload (e.g., using standard image formats and metadata wrappers to encapsulate the workloads, embed standard hypervisors in the virtual machines 114b, physical-to-virtual (P2V) or virtual-to-virtual (V2V) conversion tools to translate between different image formats, etc.). Furthermore, in cloud computing environments that can include unpredictable sets of dynamic resources external to the infrastructure 110, the workload management system coordinate such resources using a closed-loop management infrastructure 170 that manages declarative policies, fine-grained access controls, and orchestrated management and monitoring tools.

In one implementation, the workload management system may further manage the orchestrated data center to manage any suitable resources 114 involved in the virtualized workloads, which may span multiple operating systems, applications, and services deployed on various physical resources 114a and/or virtualized resources 114b (e.g., a physical server 114a and/or a virtualized server 114b). Thus, the workload management system may balance resources 114 in the information technology infrastructure 110, which may align management of resources 114 in the orchestrated data center with business needs or other constraints defined in the virtualized workloads (e.g., deploying or tuning the resources 114 to reduce costs, eliminate risks, etc.). For example, as described in further detail above, the configuration management database 185a may generally describe every resource 114 in the infrastructure 110, relationships among the resources 114, and changes, incidents, problems, known errors, and/or known solutions for managing the resources 114 in the infrastructure 110.

As such, the policy-based orchestration service may provide federated information indexing every asset or other resource 114 in the infrastructure 110, wherein the workload management system may reference the federated information to automatically implement policy-controlled best practices (e.g., as defined in the Information Technology Infrastructure Library) to manage changes to the infrastructure 110 and the orchestrated data center. For example, the configuration management database 185a may model dependencies, capacities, bandwidth constraints, interconnections, and other information for the resources 114 in the infrastructure 110, which may enable the workload management system to perform impact analysis, "what if" analysis, and other management functions in a policy-controlled manner. Furthermore, as noted above, the configuration management database 185a may include a federated model of the infrastructure 110, wherein the information stored therein may originate from various different sources. Thus, through the federated model, the configuration management database 185a may appear as one "virtual" database incorporating information from various sources without introducing overhead otherwise associated with creating one centralized database that potentially includes large amounts of duplicative data.

In one implementation, the orchestration service may automate workloads across various physical resources 114a and/or virtualized resources 114b using policies that match the workloads to suitable resources 114. For example, deploying an orchestrated virtual machine 114b for a requested workload may include identifying a suitable host virtual machine 114b that satisfies any constraints defined for the workload (e.g., matching tasks to perform in the workload to resources 114 that can perform such tasks). In response to identifying allocating and deploying the suitable host virtual machine 114b, deploying the orchestrated virtual machine 114b for the workload may include the workload management system positioning an operating system image on the host virtual machine 114b, defining and running the orchestrated virtual machine 114b on the chosen host virtual machine 114b, and then monitoring, restarting, or moving the virtual machine 114b as needed to continually satisfy the workload constraints.

In one implementation, the orchestration service may include various orchestration sub-services that collectively enable management over orchestrated workloads. For example, the orchestration service may be driven by a blueprint sub-service that defines related resources 114 provisioned for an orchestrated workload, which the workload management system may manage as a whole service including various different types of resources 114. Furthermore, a change management sub-service may enable audited negotiation for service change requests, including the manner and timing for committing the change requests (e.g., within an approval workload 130). The sub-services may further include an availability management sub-service that can control and restart services in a policy-controlled manner, a performance management sub-service that enforces runtime service level agreements and policies, a patch management sub-service that automatically patches and updates resources 114 in response to static or dynamic constraints, and a capacity management sub-service that can increase or reduce capacities for resources 114 in response to current workloads.

To provide exemplary contexts for some of the orchestration sub-services noted above, the availability management sub-service may automatically migrate a virtual machine 114b to another physical host 114a in response to a service restart failing on a current physical host 114a more than a policy-defined threshold number of times. With respect to the performance management sub-service, in response to determining that a service running at eighty percent utilization can be cloned, the service may be cloned to create a new instance of the service and the new instance of the service may be started automatically. Furthermore, to manage a patch for running instances of a service, the patch management sub-service may test the patch against a test instance of the service and subsequently apply the patch to the running service instance in response to the test passing. Regarding the capacity management sub-service, an exemplary service instance may include a service level agreement requiring a certain amount of available storage for the service instance, wherein the capacity management sub-service may allocate additional storage capacity to the service instance in response to determining that the storage capacity currently available to the service instance has fallen below a policy-defined threshold (e.g., twenty percent).

In one implementation, the orchestration service may incorporate workflow concepts to manage approval workloads 130 or other management workloads, wherein a workload database 185b may store information that the workload management system can use to manage the workloads. For example, in one implementation, an approval workload 130 may include a request to provision a particular service to a particular user in accordance with particular constraints, wherein the approval workload 130 may include a sequence of activities that includes a suitable management entity reviewing the constraints defined for the service, determining whether any applicable policies permit or prohibit provisioning the service for the user, and deploying the service in response to determining that the service can be provisioned, among other things. Thus, the workload engine 180a may execute the orchestration service to map the sequence of activities defined for any particular workload to passive management operations and active dynamic orchestration operations. For example, the workload database 185b may stores various declarative service blueprints that provide master plans and patterns for automatically generating service instances, physical distribution images and virtual distribution images that can be shared across the workload management system to automatically generate the service instances, and declarative response files that define packages and configuration settings to automatically apply to the service instances.

Collaboration

In one implementation, as noted above, the technologies integrated by the model-driven architecture 100A and the service-oriented architecture 100B may enable collaboration between entities that interact with the services provided in the information technology infrastructure 110. In particular, collaboration may generally involve dynamic teams that cross traditional security and policy boundaries. For example, where loosely affiliated organizations share data and applications, the workload management system may enable continued collaboration even when some of the participants sharing the data and applications may be temporarily offline (e.g., the workload management system may authorize certain users to allocate portions of local client resources 115 to support cross-organizational endeavors). Thus, the workload management system may provide a standard interface 160 designed to enable dynamic collaboration for end users that simplify interaction with complex systems, which may provide organizations with opportunities for more productive and agile workloads.

In one implementation, the workload management system may provide a collaboration service that enables workloads to span multiple users, applications, services, systems, or other resources 114. For example, multiple users may collaborate and share data and other resources 114 throughout the workload management system, both individually and within virtual teams (e.g., via a service bus that transports data relating to services or other resources 114 over the event bus 140). As such, the workload management system may support virtual team creation that can span organizational and geographic boundaries, wherein affiliations, content, status, and effectiveness may be represented for identities that have membership in any particular virtual team (e.g., to enable online and offline interaction between team members). In one implementation, the workload management system may provide enriched collaboration content (e.g., images, video, text, data feeds), and may efficiently transport the collaboration content between team members (e.g., via the service bus). Furthermore, the workload management system may integrate desktops, laptops, personal digital assistants, smart phones, or other suitable client resources 115 into virtual team collaboration experiences in order to meet emerging demands for mobile, interoperable, and integrated access. Thus, the collaboration enabled in the workload management system may operate in an adaptive collaborative environment, which may unify technologies for online integrated media sharing with offline authoring and editing.

In one implementation, the collaboration service may generally include a web-based platform that support inter-organization and intra-organization management for virtual teams, interoperability between various different collaboration products, social networking to deliver information that enables the virtual teams to interact efficiently either online or offline, and federated searches against any suitable information source, among other things. For example, in one implementation, the collaboration service may include various collaboration sub-services that collectively enable the adaptive collaborative environment, including a client sub-service, an aggregation sub-service, an information sub-service, a real-time collaboration sub-service, and a metadata sub-service.

In one implementation, the client sub-service may provide communication interfaces with real-time online systems, offline systems, and user interfaces. In particular, functionality for the client sub-service may be provided in a web-based interface that supports interaction with the real-time online systems in addition to software that can execute locally at client resources 115 to provide offline access to shared data and real-time meetings that may involve shared applications and shared desktops. For example, in one implementation, the client sub-service may communicate with the aggregation sub-service to coordinate the communication and collaboration across various information sources, wherein the aggregation sub-service may route messages to the appropriate information sources in appropriate formats. Furthermore, to ensure that collaborative contexts reference information that may be distributed across the infrastructure 110 rather than hosted within one particular application, the information sub-service may integrate the different information sources within the collaborative environment. As such, the virtual teams may connect and collaborate using information that originates anywhere across the infrastructure 110, and the information sub-service may enable members of the virtual teams to discuss information or other content from the various sources in an interactive manner. The real-time collaboration sub-service may interact with the information sub-service to provide real-time meetings that include audio content, video content, instant message content, and other forms of communication content in real-time collaborative contexts within the infrastructure 110 and with third-parties.

In one implementation, the metadata sub-service may provide a "helper" service to the aggregation and information sub-services, collecting ancillary metadata generated during interaction between virtual team members and create collaborative threads to maintain contexts that generated the data. Furthermore, the metadata sub-service may evaluate the ancillary metadata to discover new and relevant links between information sources and integrate data that can potentially originate from various disparate information sources. For example, the metadata sub-service may provide a uniform format for classifying data collected during collaborative contexts, which may provide a single source for virtual team members to search and display the data across any suitable collaboration source. Similarly, the metadata sub-service may index and unify data collected from disparate network sources, including various search engines and content aggregation services, to help the virtual team members to locate information that may be interesting or otherwise relevant to the collaborative contexts. As such, the various sub-services integrated within the collaboration service may provide a collaborative environment that supports dynamic interaction across organizational boundaries and different information sources in a manner that can account for any particular virtual team member's personal preferences.

Architectural Agility

In one implementation, as noted above, the technologies integrated by the model-driven architecture 100A and the service-oriented architecture 100B may collectively provide various services that the workload management system can use to manage workloads and enable intelligent choices in an information technology infrastructure 110. Furthermore, various horizontal integration components may be distributed in the workload management system to integrate the various technologies employed in the model-driven architecture 100A and the service-oriented architecture 100B and provide an agile and interoperable information technology infrastructure 110.

In particular, the horizontal integration components distributed across the workload management system may provide agility and interoperability to the information technology infrastructure 110 through support for various emerging service delivery models, including Web 2.0, Software as a Service (SaaS), mashups, hardware, software, and virtual appliances, cloud computing, grid computing, and thin clients, among others. For example, in one implementation, every service, application, or other resource 114 in the workload management system may be provided with an application programming interface 160 that can provide connectivity between different operating systems, programming languages, graphical user interface toolkits, or other suitable services, applications, or resources 114.

In one implementation, the application programming interface 160 may include a Representational State Transfer (REST) application program interface 160, which may use standard methods defined in the Hypertext Transfer Protocol (HTTP), wherein using standardized types to format data may ensure interoperability. In one implementation, the REST interface 160 may define a Uniform Resource Identifier (URI) that represents a unique identity for any suitable entity, and may further define relationships between the represented identities with hyperlinks that can be selected to access information for related identities, attribute claims, roles, policies, workloads, collaboration spaces, and workflow processes. Thus, through the use of URIs, hyperlinks, and other standard HTTP methods, the REST interface 160 may provide an interface to a data ecosystem that can be navigated in a web-based environment that can be used anywhere in the workload management system. In one implementation, the REST interface 160 may declare a namespace having version controls and standard methods to read and write to the data ecosystem, and may include a URI registry containing the URIs that represent the identities in the data ecosystem. Thus, any suitable resource 114 may programmatically discover other identities that communicate using the REST interface 160 (e.g., the REST interface 160 may be implemented in a communication gateway 112a to physical resources 114a, a communication gateway 112b to virtualized resources 114a, a communication gateway 112c to configuration resources 114c, etc.).

Furthermore, in one implementation, the workload management system may extend an application program interface stack for the supplied REST interface 160, which may enable new services, applications, and other resources 114 to be integrated into the workload management system in a manner that automatically inherits the identity-based and policy-controlled services implemented in the workload management system. In particular, the supplied application program interface stack may generally include a unified adapter and a proxy to existing and future technologies using protocols to enable services that communicate through the REST interface 160 regardless of whether the services reside in the infrastructure 110, a cloud computing environment, a third party data center, or elsewhere (e.g., web service protocols, lightweight directory protocols, messaging queue protocols, remote procedure call protocols, etc.). To provide support to developers and users that extend the application program interface stack supplied for the REST interface 160, a Recipe-based Development Kit (RDK) may provide full source code examples for various operating systems, programming languages, and graphical user interface toolkits.

Additionally, in one implementation, the workload engine 180a may manage creation of application program interface keys for the REST interface 160 stack, whereby auditing and policy-based approvals may be supported for provisioning the application program interface keys. For example, the workload management system may deploy widgets to client desktops 115, wherein the widget may track identities and contexts that include attempts to access the REST interface 160 stack. Thus, in response to provisioning or auditing application program interface keys, platform authentication and policy checks may be triggered against the accessing identity and the context that the keys supply. In a similar manner, the application program interface keys may enable the workload management system to meter costs for the information technology infrastructure 110.

Thus, the standardized stack supplied for the REST application program interface 160 may provide support for industry standard authentication and authorization methods, which may enable identity-managed and policy-controlled auditing for events and access controls. Furthermore, the extensibility of the REST application program interface 160 may enable integration with any suitable existing or future-developed system. For example, in one implementation, the REST interface 160 may be configured with standards such as the Atom Syndication Format and Atom Publishing Protocol to integrate feed synchronization, JavaScript Object Notation and Extensible Markup Language (XML) to integrate enterprise portals, mashups, and social networking platforms. Thus, in the context of feed synchronization to provide automatically notifications in response to any changes to a particular resource 114, a user may simply enter a URI for the resource 114 in an existing web browser feed aggregator (e.g., Firefox bookmarks). Thus, by providing extensible support for any suitable system, application, service, or other resources 114, the features of the REST application program interface 160 may provide agility and interoperability to the infrastructure 110.

Having described the model-driven and service-oriented architecture 100A-B that collectively provide the agile, responsive, reliable, and interoperable environment that enables the features of the workload management system, the description to be provided below will address certain particular features of the workload management system. In addition, further detail relating to the architectural foundation and other features of the workload management system may be provided in "Novell Architectural Foundation: A Technical Vision for Computing and Collaborating with Agility," "Automation for the New Data Center," and "A Blueprint for Better Management from the Desktop to the Data Center," the contents of which are hereby incorporated by reference in their entirety.

Figure 2:
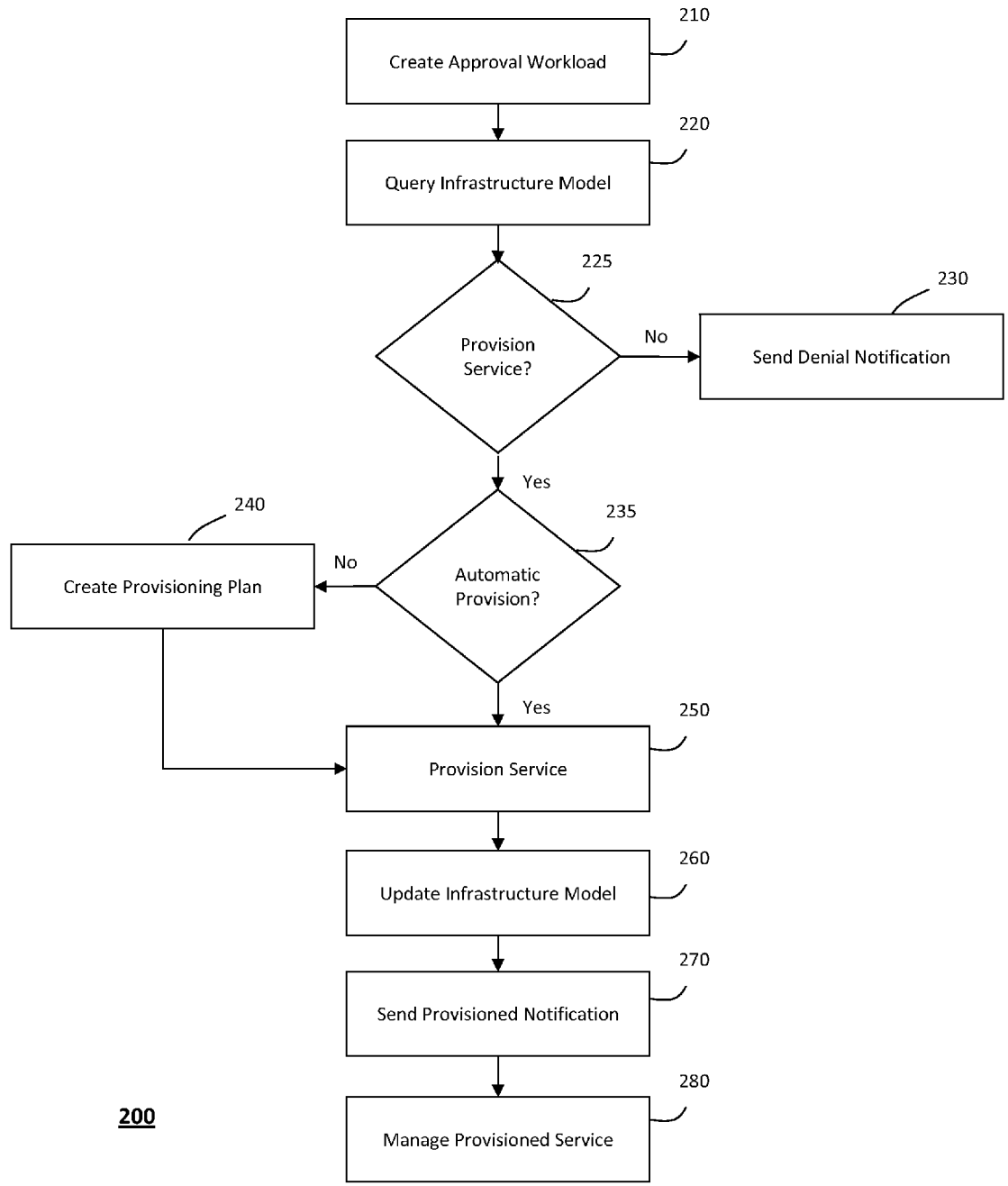
FIG. 2 illustrates a flow diagram of an exemplary method for intelligent workload management, according to one aspect of the invention.

According to one aspect of the invention, FIG. 2 illustrates an exemplary method 200 for intelligent workload management. In particular, the intelligent workload management method 200 may be used to manage approval workloads created in response to service requests. In particular, an operation 210 may include creating an approval workload in response to a receiving a request for a service from any suitable user, application, system, or other entity having an identity in the workload management system. For example, in one implementation, the request may generally specify any components needed to configure the service for a particular task (e.g., a raw machine hosting an operating system and storage may be requested to deploy a particular application in the raw machine, an existing service may be requested to specify any suitable combination of components that can deploy the application, etc.). In addition, the request may further specify desired a performance level (or service level) for the service (e.g., availability, release capacity, financial constraints, continuity, etc.), any comments for provisioning the service in a certain manner (e.g., provision the service as soon as possible, according to a particular schedule or policy, to particular members in a virtual team, with a particular configuration, etc.).

Thus, in one implementation, the request may generally include any suitable criteria that the requesting entity specifies to define constraints for deploying the requested service, wherein the workload management system may create the approval workload in operation 210 to determine whether or not the requested service can be provisioned in a manner that meets the constraints defined in the request. For example, in one implementation, the approval workload may generally define a task that includes various human and/or automated approvers (or service delivery managers) collaboratively managing the service request to determine whether the service can be provisioned as requested. Thus, to manage the approval workload, an operation 220 may include the workload management system querying a configuration management database to obtain an infrastructure model describing any computing resources and storage resources available to run the requested service.

In one implementation, the model of the computing resources obtained in operation 220 may include various rack-mounted servers and/or blade servers, which may include multi-core processors (e.g., sixty-four bit processors), a multiple gigabyte local memory, a serial-attached Redundant Array of Independent Disks (RAID), Ethernet and Storage Area Network (SAN) interfaces, and embedded hardware that can support virtualization. In addition, the computing resources may further run an appropriate operating system for the underlying physical architecture, including a virtual machine monitor (e.g., a hypervisor), various device drivers, a management kernel, and any suitable management agents. In one implementation, the management kernel and the management agents may collectively provide support for remotely deploying virtual machines to be executed by the hypervisors present on the computing resources, which may enable the workload management system to group and organize the computing resources. For example, a globally unique identifier (e.g., a URI) may be created for each of the computing resources, whereby the computing resources may be grouped or otherwise organized according to any suitable combination of a type (e.g., thin blade, symmetric multiprocessing, etc.), intended purpose (e.g., test, production, etc.), owner, physical location, or other classifying types. Furthermore, the workload management system may configure one or more of the computing resources to function in isolation or cooperatively with other computing resources to create high-availability clusters.

In one implementation, the model of the storage resources obtained in operation 220 may include various SAN disk-block storage arrays and/or file servers, whereby the storage resources may be collectively pooled and protected with identity-based policy controls. In one implementation, the computing resources described above may access the storage resources on behalf of virtual machines deployed in the infrastructure, wherein the storage resources may be individually managed during lifecycles of the virtual machines in a dynamic manner. Furthermore, the workload management system may group and organize the storage resources in a similar manner as the computing resources, wherein the workload management system may manage the storage resources according to any suitable combination of a type (e.g., available RAID-5 disks), intended purpose (e.g., temporary, protected, remotely replicated, etc.), owner, physical location, or other classifying types.

In one implementation, the model of the computing resources and the storage resources obtained in operation 220 may further include various relationships between the resources, wherein the relationships may include dependencies, capacities, and bandwidth requirements. For example, any particular virtual machine deployed in the infrastructure may generally run on physical computing resources, wherein the model may include federated information that links a network address, identities, and other information for the virtual machine with any computing resources and storage resources that have been allocated to the virtual machine, which may enable lifecycle management for the virtual machine. Thus, the configuration management database may generally provide federated knowledge detailing any suitable entity managed in the workload management system and relationships between such managed entities.

In one implementation, in response to querying the configuration management database in operation 220 to obtain the current model of the infrastructure, an operation 225 may determine whether the workload management system can provision the service requested in the approval workload in a manner that meets any constraints that the request defined for the service. In particular, the workload management system may determine whether the infrastructure model indicates that the infrastructure has available computing resources and storage resources suitable to provision the requested service. Furthermore, the workload management system may employ the identity management and policy enforcement services to determine whether the service can be provisioned to the requesting entity without violating any relevant policies. For example, to authenticate and configure a desktop machine for a chief financial officer, a biometric authorization component (e.g., a fingerprint reader) may be installed in the desktop machine. Thus, the identity management and policy enforcement services may collectively prohibit the workload management system from deploying services to the desktop machine that would add a keystroke logger, remove the biometric authorization component, or violate another policy with respect to the chief financial officer identity. In another example, requests for Bit Torrent storage may be denied regardless of an identity for the requesting identity because a policy prohibits peer-to-peer file sharing.

Thus, in response to the workload management system determining in operation 225 that the requested service cannot be provisioned in accordance with the constraints defined in the request (e.g., because the infrastructure lacks sufficient computing resources and/or storage resources to support the service, the requested service violates a relevant policy with respect to an identity for the requesting entity, etc.), the workload management system may deny the request and send an appropriate denial notification to the requesting entity in an operation 230. For example, the denial notification may provide a reason for denying the service request, which may provide information that can be referenced to analyze subsequent requests having similar criteria, modify the request based on available resources or relevant policies, audit approval processes in a compliance review, or otherwise referenced.

On the other hand, in response to determining in operation 225 that the requested service can be provisioned in accordance with the requested constraints (e.g., because the infrastructure has sufficient computing resources and storage resources to support the service, the requested service does not violate any policies with respect to the identity for the requesting entity, etc.), the workload management system may approve the request and then initiate provisioning for the service in an operation 235. In particular, in response to approving the request, the workload management system may reserve appropriate physical computing resources, virtual computing resources, and/or storage resources to run the service, wherein operation 235 may include determining whether such resources can be automatically and/or immediately allocated. For example, certain workloads may be prioritized to ensure that business objectives can be met, wherein the workload management system may defer the approval workload in operation 235 in response to determining that allocating the resources to the approval workload may occupy resources needed for higher priority workloads (e.g., because the reserved resources are currently subject to a "blackout" period for patching or updating the resources).

As such, in response to determining that the resources reserved to the service cannot be provisioned automatically and/or immediately, the workload management system may manage creation of a provisioning plan for the service in an operation 240. In particular, operation 240 may include various automated and/or human entities interacting to create the provisioning plan, wherein the provisioning plan may include pre-empting the approval workload until workloads in a high priority queue have completed, moving the approval workload to the high priority queue, dynamically allocating additional resources to the approval workload (e.g., pre-empting lower priority workloads), or otherwise balancing utilization of the resources in the infrastructure between business processes and system processes that may have different priorities. Furthermore, in one implementation, the workload management system may coordinate the interaction between the entities that create the provisioning plan in operation 240 (e.g., because the service cannot be provisioned until a certain process has completed, a certain entity provides feedback, etc.). As such, operation 240 may generally include various processes and interactions between entities, which the workload management system may manage to create the plan for suitably provisioning the approved service.

In one implementation, in response to determining that the resources reserved to the service can be provisioned automatically and immediately, or alternatively in response to successfully creating the provisioning plan for the service in operation 240, the workload management system may provision the requested service in an operation 250. In particular, operation 250 may include allocating an operating system image, a resource inventory, and software to an orchestrated virtual machine that can run the service and embedding lifecycle control information within the orchestrated virtual machine to enable management for the virtual machine and the computing resources allocated to the service. In one implementation, one or more of the computing resources in the infrastructure may be configured as an image creation server, wherein the image creation servers may be dedicated to creating and installing virtual machines in various ways. For example, in a large information technology infrastructure that frequently creates virtual machine instances, multiple image creation servers may be employed to create and install the virtual machines, or one or more of the image creation servers may be configured to create "in-place" virtual machines, wherein such virtual machines may be incubated on particular computing resources that further execute the virtual machines.

Thus, in one implementation, operation 250 may include invoking an image creation service, which may create a virtual machine image to run the requested service. For example, the image creation service may contact an image repository that contains various ready-to-run virtual machine images and then appropriately download one or more of the virtual machine images that can run the requested service. The image creation service may then clone and configure the virtual machine image downloaded from the image repository based on any constraints that the request defines for the service. As such, operation 250 may generally include creating a new virtual machine having an operating system image, external storage references, and control information particularly configured for the requested service (e.g., based on identities, policies, service level agreements, lifecycle management, etc.), and may further include deploying the newly created virtual machine to computing resources that have been reserved to run the requested service. Alternatively (or additionally), the image creation service may provide a push model for deploying the virtual machine image, wherein the image creation service may instruct the image repository to multi-cast the image to multiple computing resources. Thus, the push model implementation may pre-stage the multi-casted virtual machine image for deployment over various potential deployment targets.

In one implementation, in response to successfully provisioning the service in operation 250, the workload management system may update the infrastructure model in an operation 260. For example, any resources, identities, policies, or other information associated with the provisioned service may be indexed within a global namespace in the federated configuration management database. As such, the workload management system may reference the updated infrastructure model to track registered virtual machines that have been provisioned and deployed in the infrastructure, hierarchical relationships between the registered virtual machines and the resources, identities, policies, or other information associated with the virtual machines, and otherwise provide lifecycle management for the virtual machines, as will be described in greater detail below. Furthermore, an operation 270 may include the workload management system sending a service provisioning notification to the requesting entity, wherein the notification sent in operation 270 may indicate that the service has been successfully provisioned, provide information that can be referenced to analyze subsequent requests having similar criteria, audit approval processes in a compliance review, or otherwise provide information relevant to the provisioned service.

In one implementation, the workload management system may manage the provisioned service in an operation 280 in response to successfully provisioning the service in operation 250. In particular, as noted above, updating the infrastructure model in operation 260 may provide information that the workload management system can reference to provide lifecycle management for services provisioned and deployed in the infrastructure. For example, various lifecycle rules and control information may be used to respond to variable computing demands, changes, and unexpected events in the infrastructure, wherein services that run within virtual machines may introspectively monitor and report on health of the hosted services. Thus, the provisioned service may be managed in operation 280 with the lifecycle control information embedded in the host virtual machines (e.g., monitoring real-time execution states and other health conditions, automatically managing identities and policies in response to monitored health conditions, retiring resources reserved or allocated the virtual machine that may no longer be needed, etc.).

In addition, the workload management system may cooperate with the lifecycle controls embedded in the host virtual machines to manage the provisioned service. In particular, the workload management system may aggregate information relating to the monitored states reported from individual virtual machine instances and record such information within a context describing a current state of the infrastructure model. Thus, physical constraints, dependencies, current performance trends, and other real-time execution states may be monitored to schedule virtual machines that run provisioned services to computing resources for execution in a manner that satisfies any identity constraints, policy controls, service level agreements, or other constraints that have been defined for the services. For example, operation 280 may include applying policy-defined thresholds to any status events generated by the monitored computing resources, storage resources, virtual machines, or other resources (e.g., responding to a monitored variable that exceeds or falls below a policy-defined threshold for more than a policy-defined time period). In another example, operation 280 may further include managing version controls for virtual machine images, which may provide support for inserting management agents that can tune or patch the virtual machine images as needed, and rolling the virtual machine images back to a "pristine" state, among other things.

Thus, the techniques described above the intelligent workload management method 200 may generally provide lifecycle management from creating a virtual machine image that can host a requested service through eventual retirement of the virtual machine image. Moreover, in addition to introspective health monitoring and maintenance for individual virtual machine images, the lifecycle management techniques may provide federated information for managing an entire information technology infrastructure, which may be used to assure compliance with legal and contractual obligations for any suitable hardware or software that an organization may use, create detailed plans for implementing or rolling back proposed changes to the infrastructure, detect, resolve, and otherwise remediate incidents in the infrastructure, reactively and proactively manage problems in the infrastructure with known workarounds, fixes, and permanent infrastructure changes, and ensure that every service in the infrastructure meets or exceeds service level requirements, among other things.

Figure 3:
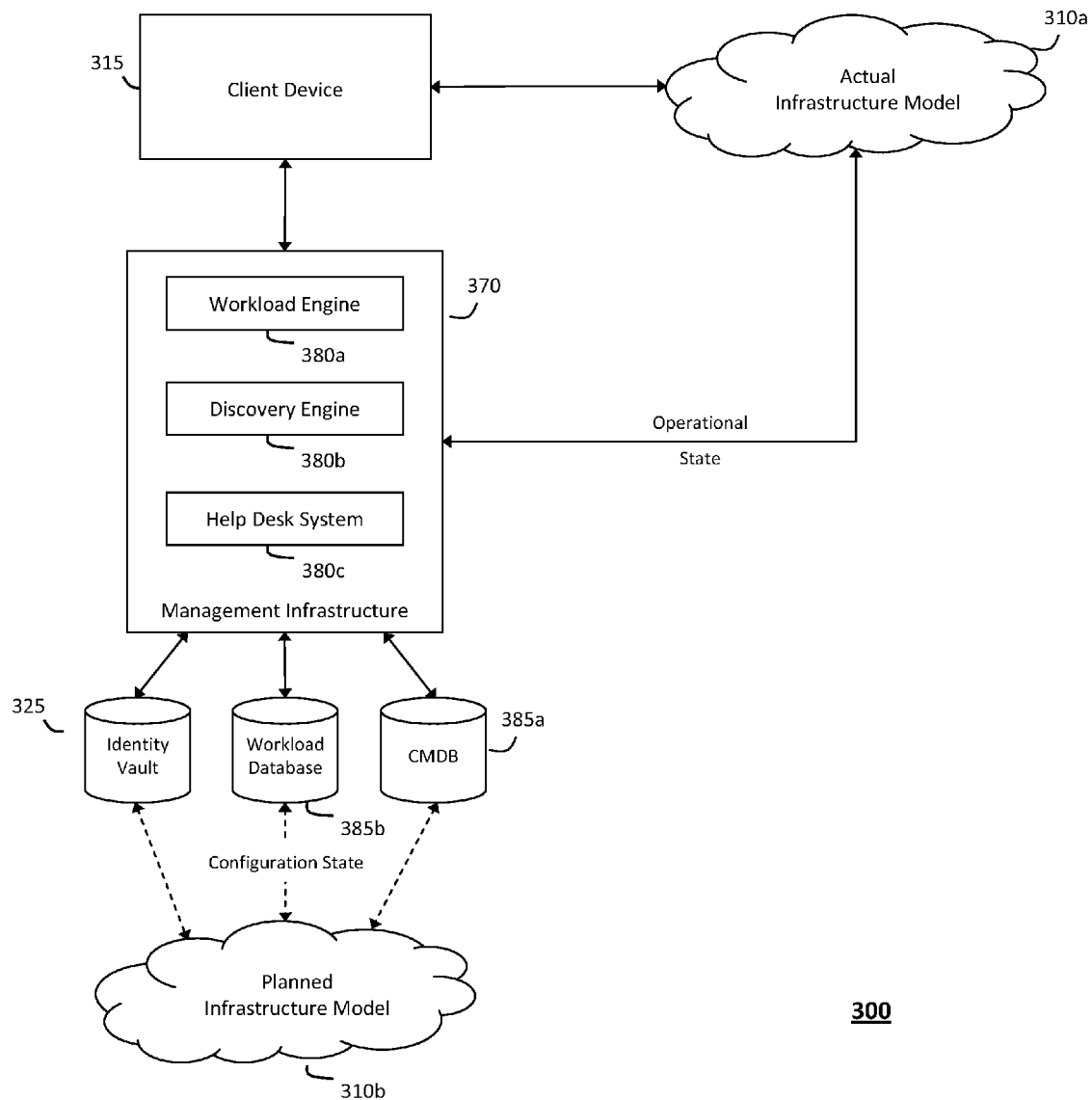
FIG. 3 illustrates a block diagram of an exemplary system for discovering enriched information technology models in the intelligent workload management system, according to one aspect of the invention.

According to one aspect of the invention, FIG. 3 illustrates an exemplary system 300 for discovering enriched information technology models in the intelligent workload management system. In one implementation, the information technology models may be enriched with workload entitlements derived from single sign-on workload identities, which may be generated from authentication tokens that define various credentials or permissions assigned to any suitable user, application, system, service, resource, or other entity having an identity managed in the workload management system. In particular, as described in further detail above in connection with FIG. 1A-B and FIG. 2, the workload management system may generally provide various services that integrate information technologies for identity management, policy enforcement, compliance assurance, managing physical computing and storage resources, orchestrating virtual machines that run on the physical computing resources and reference the physical storage resources, enabling collaborative virtual teams, and providing architectural agility, among other things. The workload management system may therefore include a management infrastructure 370 having a workload engine 380a that can dynamically allocate physical resources to host virtual machines that run applications and services supporting infrastructure workloads, which may enable a distributed and virtualized data center that enables mobility for any suitable client device 315.

As such, to manage mobility for client devices 315 or other resources in the distributed and virtualized data center, the workload engine 380a may use at least the integrated identity management technologies to securely name, associate, authenticate, and authorize identities that may consume applications and services in the workload management system. More particularly, in one implementation, managed identities may be stored in a federated identity vault 325 that provides a context to bind information technology processes managed by the workload engine 380a (e.g., from a service request that a particular entity provides to data that the request targets in the physical storage resources). For example, the identity vault 325 may contain various managed identities that grant users rights or permissions to applications, services, or other resources, and the identity vault 325 may further contain various managed identities that grant the applications, services, or other resources rights or permissions to other applications, services, or resources. Moreover, the managed identities stored in the identity vault 325 may define various different roles for the represented entities, whereby the identity vault 325 may define federated rights, permissions, or other credentials granted to represented entities across various authentication domains. Thus, the system 300B may employ various identity data abstractions maintained in the federated identity vault 325 to generate workload entitlements that can enrich discovery in the workload management system (e.g., single sign-on authentication tokens generated by an authentication server).

For example, the management infrastructure 370 may further include a discovery engine 380b that can identify and describe an operational state for any resource in an actual model 310a of the information technology infrastructure. In one implementation, the discovery engine 380b may any suitable agent-based technique or agent-less technique to discover physical devices in the actual infrastructure model 310a, such as an Internet Control Message Protocol (ICMP) ping, a Simple Network Management Protocol (SNMP) Get, or Transmission Control Protocol (TCP) port probing, among others. As such, the discovery engine 380b may discover various types of information to identify and describe the physical devices in the actual infrastructure model 310a. For example, the information discovered for the physical devices may include processor types, reboot capabilities, virtualization capabilities, hardware components, out-of-band management capabilities, power supply ratings, or other information. Additionally, the discovery engine 380b may further discover various types of information to identify and describe applications running in the actual infrastructure model 310a. For example, in one implementation, the discovery engine 380b may use application fingerprinting to discover the applications running in the actual infrastructure model 310a, wherein the application fingerprinting may include matching artifacts or other information discovered for the physical devices with predetermined application attributes that identify and describe the applications (e.g., file locations, registry settings, service signatures, etc.).

Furthermore, in one implementation, the discovery engine 380b may discover workload entitlements or various other dependencies between the applications, physical devices, and other resources in the infrastructure to discover the applications and services running in the actual infrastructure model 310a. In particular, applications may generally include one or more aggregated services, while services may generally include one or more aggregated resources, whereby the dependencies discovered in the actual infrastructure model 310a may identify and describe any applications configured to interact with services actively running in the actual infrastructure model 310a. In particular, in one implementation, the services running in the actual infrastructure model 310a may be hosted by various virtual machines that run on the physical devices discovered in the infrastructure. Thus, the dependencies discovered by the discovery engine 380b may include relationships between identities that define workload entitlements for the virtual machines, the physical devices that host the virtual machines, any applications that the virtual machines execute, any users that interact with the virtual machines or the applications that the virtual machines execute, or any other suitable entity having an identity managed in the workload management system. For example, the relationships may include network addresses, storage locations, capacity and bandwidth requirements, lifecycle control information, or other information associated with the unique identities that define the workload entitlements for the virtual machines, which may define dependencies between the identities for the virtual machines and the identities for the applications, physical devices, users, or other entities discovered in the actual infrastructure model 310a.

As such, in one implementation, the actual infrastructure model 310a discovered by the discovery engine 380b may include discovered physical devices, applications, services, and other resources, managed identities for the discovered physical devices, applications, services, and other resources, and relationships or other dependencies between the discovered physical devices, applications, services, and other resources. In one implementation, a snapshot of the actual infrastructure model 310a may then be persistently stored in a federated configuration management database 385a that provides version controls and other features for managing the infrastructure model 310. For example, the configuration management database 385a may further contain a planned version of the infrastructure model 310b that includes planned changes to the infrastructure, whereby the management infrastructure 370 can monitor the actual infrastructure model 310a and compare the actual infrastructure model 310a to the planned infrastructure model 310b to determine whether the planned changes have been properly implemented. In addition, the configuration management database 385a may further contain previous versions of the infrastructure model 310, whereby the management infrastructure 370 can manage remediation workloads to restore previous versions of the infrastructure model 310 in response to problems or other incidents in the actual infrastructure model 310a. Thus, the configuration management database 385a may maintain various versions of the infrastructure model 310 to provide federated knowledge for managing actual operational states, configuration states, prior states, or other states for the infrastructure.

In one implementation, the federated infrastructure knowledge maintained in the configuration management database 385a may be further integrated with a help desk system 380c that can provide known errors and solutions, problem histories, workarounds, and temporary fixes that can be referenced to resolve minor incidents without having to contact human personnel at the help desk system 380c. For example, in response to experiencing an incident or other problem with the client device 315 or another resource in the infrastructure, a user may submit a trouble ticket detailing the incident to the help desk system 380c, which may attempt to automatically identify any information in the configuration management database 385a that can be used to resolve the incident (e.g., matching the incident to a similar error in the problem histories and returning a known solution, workaround, or temporary fix that previously resolved the similar error). In another example, in response to the discovering a particular service running on a particular port, enriching such discovery with workload entitlements may be used to determine whether a user running the service has the appropriate entitlements to run the service on the particular port. Thus, the help desk system 380c may provide various automated remediation procedures that can discover problems in the infrastructure, which may be reported to the workload engine 380a to fix or otherwise remediate the problems in a remediation workload.

For example, in one implementation, the workload engine 380a may reference a workload database 385b in response to receiving a reported problem from the help desk system 380c, wherein the workload engine 380a may retrieve a previous remediation workload that can be employed to remediate the problem, or the workload engine 380a may add a new remediation workload to the workload database 385b and manage the remediation workload to remediate the problem. In particular, the remediation workloads that the workload engine 380a manages may include any suitable combination of automated and human intervention, wherein the workload engine 380a may coordinate interaction between various automated systems and human entities to remediate the problem, as appropriate. For example, remediating an issue such as disaster failover may include automatically migrating services to recovery resources, whereas diagnosing, troubleshooting, or remediating a problematic application may primarily include interaction between human personnel, while other problems may include suitable combinations of automatic intervention and human intervention. In this context, the managed identities may bind remediation workloads to certain entities, such that the workload database 385b may detail information relating to identities involved in the problems and any resolution to the problems.

In one implementation, the federated infrastructure knowledge maintained in the configuration management database 385a may further provide the management infrastructure 370 with information for managing planned changes to the infrastructure. In particular, the federated infrastructure knowledge may detail managed identities, service components, and dependencies in the infrastructure, which may be referenced to determine best practices for implementing the planned changes. For example, in one implementation, discovered information stored in the configuration management database 385a may be used to prepare an organization for a Payment Card Industry (PCI) compliance review, wherein the discovery engine 380b may discover data detailing every resource and managed identity that interacts with PCI credit card information and export the data to a suitable database for further analysis. In another example, the discovered information may be used to prepare a service for deployment to a cloud computing environment, in which case application fingerprinting may be executed for the service to discover every dependency for the service, construct a cloud packaging scenario for the service, and send a notification to any managed identities that may be impacted by deploying the service to the cloud computing environment. In yet another example, the discovered information may be used to reduce costs for maintaining an application, wherein fingerprinting for the application may be executed to discover every instance of the application, managed identities that use the application instances, and create an elimination or consolidation plan based on comparative values, utilizations, and costs for maintaining the application instances (e.g., if twenty-thousand users interact with one instance of the application at a cost of $1,000,000, while two users interact with a second instance of the application at a cost of $500,000, the second instance may be recommended for elimination or consolidation with the first instance).

Figure 4:
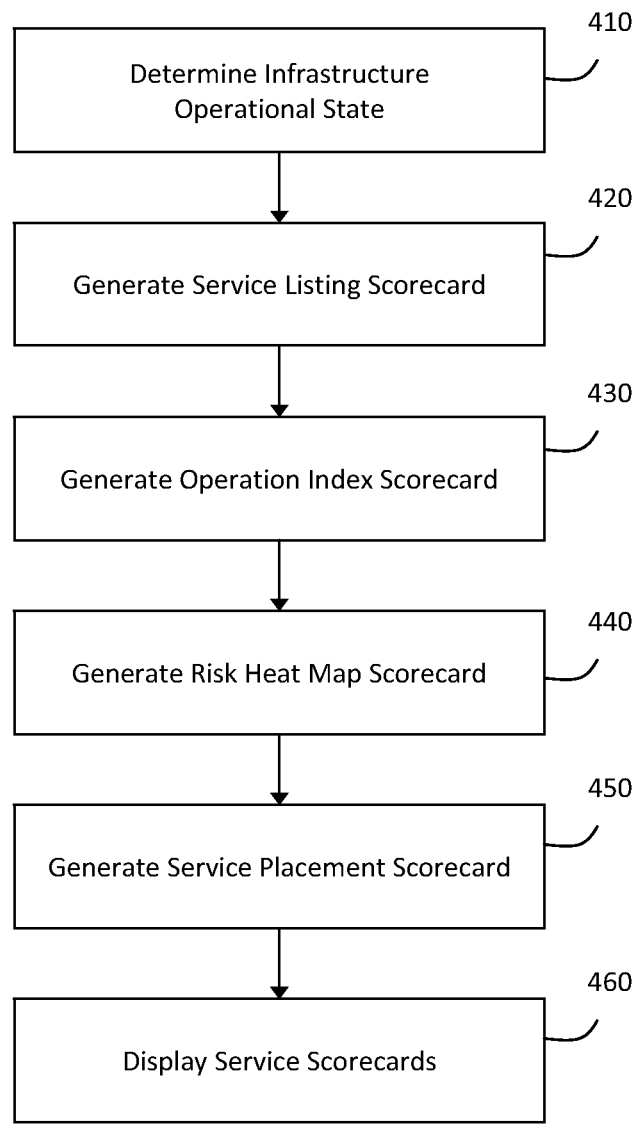
FIG. 4 illustrates a flow diagram of an exemplary method for generating scorecards to visualize and tune services in the intelligent workload management system, according to one aspect of the invention.

According to one aspect of the invention, FIG. 4 illustrates a flow diagram of an exemplary method 400 for generating scorecards to visualize and tune services in the workload management system. In particular, and as described in further detail above, the workload management system may generally include a federated configuration management database that contains various version-controlled models of an information technology infrastructure, including previous versions of the infrastructure model, a current operational version of the infrastructure model, and planned or proposed versions of the infrastructure model. For example, in one implementation, the version-controlled infrastructure models stored in the federated configuration management database may describe every resource, asset, or other suitable configuration items in the infrastructure, including dependencies or other relationships between the resources, assets, or other configuration items in the infrastructure. Thus, in the context of the method 400 illustrated in FIG. 4 and described herein, a current state of the information technology infrastructure and the version-controlled infrastructure models stored in the configuration management database may be analyzed to generate various scorecards that can be used to visualize and tune services in the workload management system.

In one implementation, the workload management system may invoke a discovery engine in an operation 410, wherein the discovery engine may determine a current operational state for the infrastructure. In particular, determining the infrastructure operational state in operation 410 may include the discovery engine deriving various types of information from the infrastructure that can inform choices for managing the infrastructure in a manner that suits the needs of a particular business. For example, in one implementation, the operational state determined for the infrastructure in operation 410 may describe various services, applications, workloads, or other resources running in the infrastructure, including identities, operational dependencies, or other relationships between the various services, applications, workloads, or other resources in the infrastructure (e.g., from information contained in an identity vault). Furthermore, in one implementation, the configuration management database may index the running services, applications, workloads, or other resources with various parameters (e.g., business value, usage, cost, security, risk, performance, etc.), wherein the indexing parameters in the configuration management database may be derived from monitored activity in the infrastructure. For example, in one implementation, a management infrastructure may employ various techniques to sniff packets or activity that occurs in the infrastructure to determine managed identities having entitlements to access certain services, applications, workloads, or other resources in the infrastructure, and further to derive metrics that describe the managed identities actually access to the entitled resources (e.g., whether or not certain managed identities have been accessing the entitled resources, frequencies that described how often certain managed identities have been accessing the entitled resources, etc.) As such, the operational state determined in operation 410 may include various types of information that describe the resources in the infrastructure and activity associated with the resources, which may then be used to generate various scorecards for visualizing and tuning the services, applications, workloads, or other resources in the infrastructure.

In one implementation, the various scorecards for visualizing and tuning the services, applications, workloads, or other resources in the infrastructure may include a service listing scorecard, which may be generated in an operation 420. In particular, FIG. 5A illustrates an exemplary instance of the service listing scorecard that may be generated in operation 420, wherein the service listing scorecard may be used to visualize and tune costs in the infrastructure. The service listing scorecard may generally describe every service, application, and workload discovered in the infrastructure, which may be scored with the indexing parameters that describe the business value, usage, and cost for the discovered services, applications, and workloads. For example, the exemplary service listing scorecard shown in FIG. 5A describes a first SAP service instance indexed with the identifier 101, a second SAP service instance indexed with the identifier 103, and a PeopleSoft service instance indexed with the identifier 201. However, the service listing scorecard illustrated in FIG. 5A will be understood as providing a limited number of service instances for ease of description, as the service listing scorecard may include many additional entries describing various other services, applications, and workloads that may be running in the infrastructure, as appropriate.

In one implementation, the service instances described in the service listing scorecard may further include resource names that describe contexts for the service instances. For example, the service listing scorecard shown in FIG. 5A indicates that the first instance 101 of the SAP service provides an accounts payable (AP) resource, the second instance 103 of the SAP service provides an information services and technology (IS&T resource service, and the instance 201 of the PeopleSoft service provides a human resources (HR) resource. Additionally, the service listing scorecard may visualize business values, usages, and costs for the various service instances. For example, in one implementation, the business values may be expressed within a range of numeric values (e.g., from one, representing a lowest business value, to five, representing a highest business value), while the usages may be expressed in a numeric value (e.g., derived from a number of users authorized to interact with the service, a number of users that actually interact with the service, utilization metrics that represent actual usage versus total capacity, etc.). Furthermore, the service listing scorecard may provide estimated costs for the service instances, wherein the estimated costs may be derived from any resources in the infrastructure that support the service (e.g., costs for obtaining software licenses, purchasing physical hosting resources, etc.), the usage of the service (e.g., costs for obtaining additional storage capacity for a highly used service), or various other factors that may be included in the cost for the service instances.

As such, the various factors included in the cost for the service instances may be used to derive estimated costs for the service instances, wherein the estimated costs may include an estimated usage per hour cost and an estimated resource cost for each service instance, which may then be multiplied to obtain an estimated total cost for each service instance. Additionally, in one implementation, the total cost for each service instance may include a selectable graphical control element. For example, in response to a selection of the total cost graphical control element, the workload management system may obtain further details on the underlying factors that resulted in the total cost determination (e.g., describing costs for individual resources that support the service instances, numbers of users authorized to interact or actually interacting with the service instances, etc.). As such, the service listing scorecard may be used to create movement or retirement plans for the service instances, wherein decisions regarding whether to move or retire the service instances may be informed through detailed information describing the factors underlying the cost for maintaining the service instances. For example, moving a service instance hosted on expensive physical resources to a virtualized data center may substantially reduce the cost for the service instance without compromising any functionality that the service instance may provide. In another example, in response to determining that a first instance of a service supports a small number of users and therefore has a large cost per user, while a second instance of the service supports a large number of users and therefore has a small cost per user, retiring the first instance of the service and migrating the users to the second instance of the service may substantially reduce the overall cost for the service.

In one implementation, the scorecards may further include an operation index scorecard, which may be generated in an operation 430. In particular, FIG. 5B illustrates an exemplary instance of the operation index scorecard that may be generated in operation 430, wherein the operation index scorecard may be used to visualize and tune the current operational state in the infrastructure. In particular, the operation index scorecard may express the overall operational state of the infrastructure within a primary range that represents agility versus rigidness in the infrastructure, wherein whether the infrastructure has more agility or more rigidness may be determined from various factors such as security, risk, and virtualized deployment, among other things (e.g., a high degree of security may provide more rigidness while low security may provide more agility, a high degree of risk may provide more agility while low risk may provide more rigidness, a high degree of virtualized deployment may provide agility while a high degree of physical deployment may provide more rigidness, etc.). Furthermore, the operation index scorecard may further express the overall operational state of the infrastructure within various secondary ranges, which may represent overall complexity, cost, availability, or other characteristics of the current operational state for the infrastructure.

As such, in response to determining the current operational state for the infrastructure in operation 410, the operation index scorecard generated in operation 420 may visually represent whether the current operational state has more agility or rigidness within the primary range, while the overall complexity, cost, and availability for the current operational state may be visually represented within the various secondary ranges. Furthermore, in one implementation, the primary range and the secondary ranges may represent the current operational state with graphical slider mechanisms, which may be selected and moved to tune the current operational state. In particular, an administrator, manager, or other suitable entity may manually move the graphical slider mechanism along the primary range to broadly balance the agility and the rigidness of the infrastructure to establish a desired index in the primary range. Alternatively (or additionally), adjustments to the primary slider mechanism may be policy-based, wherein one or more policies may restrict permitted movement of the primary slider within the primary range or automatically establish the desired index. For example, a particular policy may restrict how far the primary slider can be moved towards the most agile index to prevent security risks, or the particular policy may automatically establish the desired index to ensure that the infrastructure has sufficient rigidness to prevent the security risks.

In one implementation, in response to determining that the primary slider mechanism has been moved within the primary range, the workload management system may then create a plan detailing one or more changes that can be implemented in the infrastructure to reach the desired index. Furthermore, the slider mechanisms provided in the secondary ranges for complexity, cost, and availability may be automatically refreshed to reflect any changes caused by moving the primary slider within the primary range. As such, in response to creating the plan detailing the changes needed to reach the desired index specified by the user or defined by any relevant policies, one or more the secondary sliders may be moved along the secondary ranges to fine-tune the complexity, cost, and availability of the infrastructure. For example, in one implementation, increasing the rigidness of the infrastructure may reduce the overall complexity of the infrastructure while increasing the overall cost and availability of the infrastructure. Thus, the secondary sliders may provide further control for fine tuning the infrastructure in a manner that best suits the particular needs of a business (e.g., in response to the primary adjustment causing an undesirable index in any of the secondary ranges, the secondary sliders may be moved to establish a desired index in such secondary ranges).

In one implementation, in response to determining that one or more of the secondary sliders have been moved within the secondary ranges, the workload management system may then create a plan detailing one or more changes that can be implemented in the infrastructure to reach the desired indices established in the secondary ranges. Furthermore, in response to the adjustment to the secondary ranges, the index in the primary range may then be similarly refreshed to reflect any changes caused by moving the secondary sliders. Thus, the index in the primary range and the indices in the secondary ranges may be continually adjusted in an iterative manner until the desired balance between agility, rigidness, complexity, cost, and availability has been reached. As such, although the adjustments to the operational state of the infrastructure has been described herein in the context of initially tuning the primary slider in the primary range, the operational state adjustments may proceed in any suitable order (e.g., a user may suitably adjust the cost range first, adjust the agility versus rigidness range next, adjust the complexity range next, re-adjust the cost range next, etc.). In response to the establishing the desired index in the primary range and the desired indices in the secondary ranges, the workload management system may then finalize the plan for reaching the desired indices and control a suitable workload to implement such changes.

In one implementation, the scorecards may further include a risk heat map scorecard, which may be generated in an operation 440. In particular, FIG. 5C illustrates an exemplary instance of the risk heat map scorecard that may be generated in operation 440, wherein the risk heat map scorecard may be used to visualize and tune risk to coverage ratios in the infrastructure. In one implementation, the risk heat map scorecard may visually display risks in different areas of the infrastructure, wherein the risks in the different areas may be further represented across different coverage ratios for the infrastructure. In particular, the risk determinations displayed in the risk heat map may represent risks in particular areas of the infrastructure, wherein the risk in the particular areas may vary depending on a ratio of the infrastructure that the risk determination covers (e.g., a determination that the infrastructure complies with certain policy or regulatory requirements may be misleading or inaccurate in certain cases, such as where the compliance determination was based on an analysis that only covers ten percent or another portion of the infrastructure).

In one implementation, as shown in FIG. 5C, the risk heat map scorecard may display risks for compliance with Sarbanes-Oxley (SOX) requirements, Payment Card Industry (PCI) standards, the Health Insurance Portability and Accountability Act (HIPAA), Information Technology Infrastructure Library (ITIL) best practices, Control Objectives for Information and Related Technology (COBIT) requirements, or other suitable areas that may be associated with risk in the infrastructure. Thus, the risk heat map scorecard may represent the risk within the various risk areas as a function of the coverage ratio. For example, FIG. 5C visually displays a low risk of SOX non-compliance when the coverage ratio encompasses only twenty percent of the infrastructure, whereas the risk may be even lower when the coverage ratio encompasses the entire infrastructure. In another example, the risk of PCI non-compliance may be high when the coverage ratio encompasses twenty percent of the infrastructure, low when the coverage ratio encompasses forty to eighty percent of the infrastructure, but highest when the coverage ratio encompasses the entire infrastructure. Thus, the risk heat map scorecard may visually represent the risk to the infrastructure within various areas at different levels of infrastructure coverage, wherein the individual risk ratios in the scorecard may be selected to drill down into the underlying parameters that resulted in the risk determination. Furthermore, in response to a selection of one or more of the individual risk ratios in the risk heat map scorecard, the workload management system may provide recommendations for improving the risk to coverage ratios (e.g., identifying parameters in the infrastructure that increase the relevant risk and recommending changes to the infrastructure to mitigate the effect that the parameters have in the particular risk area).

In one implementation, the scorecards may further include a service placement scorecard, which may be generated in an operation 450. In particular, FIG. 5D illustrates an exemplary instance of the service placement scorecard that may be generated in operation 450, wherein the service placement scorecard may be used to visualize and tune locations in the infrastructure where the services, applications, workloads, or other resources may be deployed or otherwise placed. For example, the service placement scorecard may visually represent the services, applications, and workloads running in the infrastructure in a generally similar manner as the service listing scorecard described in further detail above. In particular, the service placement scorecard may provide identifiers and resource names detailing the running services, applications, and workloads, which may be further indexed with parameters for security, risk, cost, and performance. In one implementation, the parameters may be indexed within numeric ranges (e.g., one to five) that generally represent actual measured values associated with the security, risk, cost, and performance for the services, applications, or workloads displayed in the service placement scorecard.

For example, in response determining that many users have authorization to access or otherwise interact with a particular service but only a small number of the authorized users actually access the service, the security parameter may be assigned a high index (e.g., a large number of authorized users may reflect a vulnerability that can be closed because only a small number of the authorized users actually access the service). Furthermore, the index for the risk parameter may include an aggregated risk determination across different areas of the infrastructure (e.g., derived from the risk heat map scorecard shown in FIG. 5C), the index for the cost parameter may include an aggregated cost determination (e.g., derived from the service listing scorecard shown in FIG. 5A), and the index for the performance parameter may reflect whether the service, application, or workload conforms to a service level agreement that defines anticipated performance metrics versus actually measured performance metrics. The indices for the security, risk, cost, and performance parameters may then be aggregated to create a total index.

In particular, in one implementation, the total index for a particular service, application, or workload may indicate the most effective placement for the particular service, application, or workload. In particular, the service placement scorecard may define various ranges that indicate whether deployment in a physical, virtualized, or cloud data center would be the most effective placement for certain services, applications, or workloads. For example, in response to defining a one to five numeric range for the security, risk, cost, and performance parameters, the total index for a particular service, application, or workload may fall anywhere between four to twenty (inclusive). Thus, as shown in FIG. 5D, instances of SAP services may be recommended for placement within a cloud data center in response to the total index falling in a first range (e.g., four to ten), within a virtualized data center in response to the total index falling in a second range (e.g., eleven to fifteen), and within a physical data center in response to the total index falling in a third range (e.g., sixteen to twenty). Further, the ranges for determining whether to recommend placement within cloud, virtualized, or physical data centers may vary for different services, applications, and workloads (e.g., the cloud and virtualized deployment ranges may be larger for services that have minimal, flexible, or otherwise agile physical hosting requirements, whereas the physical deployment range may be larger for services that have substantial or rigid physical requirements). The recommended target for the various services, applications, may workloads may then be selected to view further details on any factors underlying the recommended placement (e.g., the relevant ranges, factors underlying the indices for the security, risk, cost, or performance parameters, etc.), and the recommended target may be selected to create a plan to move the instance to the recommended data center.

Figure 6:
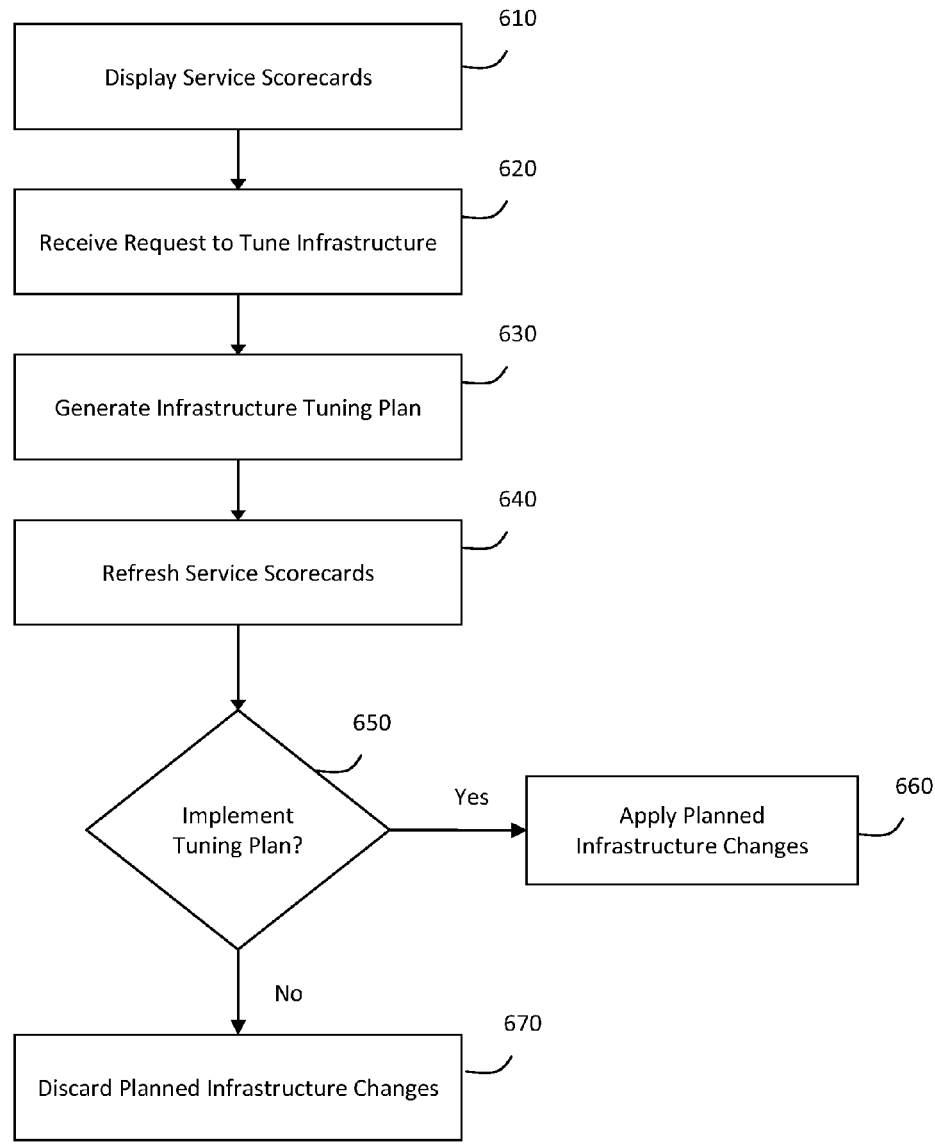
FIG. 6 illustrates a flow diagram of an exemplary method for tuning an infrastructure with the service scorecards in the intelligent workload management system, according to one aspect of the invention.

Thus, in response to generating the service listing scorecard, the operation index scorecard, the risk heat map scorecard, and the service placement scorecard, the various scorecards may then be displayed in an operation 460. For example, in one implementation, the various scorecards may be displayed within one or more graphical user interfaces on any suitable display device communicatively coupled to the workload management system. As such, the administrator, manager, or other entity may view the scorecards displayed in operation 460 to visualize the services, applications, workloads, or other resources in the infrastructure, and may further interact with one or more of the graphical control elements provided in the scorecards to tune the services, applications, workloads, or other resources in the infrastructure. For example, FIG. 6 illustrates a flow diagram of an exemplary method 600 for tuning the information technology infrastructure with the service scorecards, wherein an operation 610 may include displaying the service scorecards in a similar manner as noted above with respect to operation 460 in FIG. 4.

In one implementation, an administrator, manager, or other suitable entity may then view the scorecards and interact with one or more graphical control elements provided in the scorecards to initiate a request to tune the infrastructure. As such, in response to the administrator, manager, or other entity interacting with the graphical control elements in the scorecards, an operation 620 may include analyzing the interaction to identify characteristics of the request to tune the infrastructure. For example, as described in further detail above, the service listing scorecard may provide control elements for tuning the cost for individual services, applications, and workloads, the operation index scorecard may provide control elements for tuning the overall agility, rigidness, complexity, cost, and availability for the infrastructure, the risk heat map scorecard may provide control elements for tuning risk across various areas and coverage ratios, and the service placement scorecard may provide control elements for tuning physical, virtualized, or cloud deployment for individual services, applications, and workloads. Thus, in response to identifying the characteristics of the request to tune the infrastructure, which may include interaction with one or more of the scorecards, an operation 630 may generate a plan to appropriately tune the infrastructure based on the characteristics of the tuning request.

Furthermore, in response to generating the tuning plan, an operation 640 may include refreshing one or more of the service scorecards to reflect changes to the infrastructure that may be defined in the tuning plan (e.g., refreshing the service listing and/or service placement scorecards in response to a request to tune the secondary cost slider in the operation index scorecard, refreshing the risk heat map scorecard in response to selecting a recommended target that moves a service from a physical data center to a cloud data center and causes a resulting change in the risk for the service, etc.). In one implementation, the administrator, manager, or other entity may then view the tuning plan generated in operation 630 and the service scorecards refreshed in operation 640 to determine whether or not to implement the tuning plan. For example, an operation 650 may include the administrator, manager, or other entity determining that the tuning plan raises the overall cost for the infrastructure, results in increased risk, or otherwise has undesirable consequences. Thus, in response to determining that the tuning plan should not be implemented, an operation 670 may include discarding the infrastructure changes defined in the plan (and/or restoring the service scorecards to states that existed prior to generating the tuning plan). Alternatively, in response to suitably approving the tuning plan in operation 650, the infrastructure changes defined in the plan may then be applied in an operation 660. For example, the workload management system may create and manage a tuning workload that coordinates collaborative interaction between various automated and/or human entities to apply the changes defined in the plan, as described in further detail above.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system for providing scorecards to visualize services in an intelligent workload management system, comprising:
    an identity vault that stores federated information defining entitlements for a plurality of unique identities across a plurality of authentication domains, the entitlements derived from single sign-on workload identities, generated from authentication tokens that define various credentials and permissions assigned to any suitable user, application, system, service, or resource;
    a discovery engine that discovers an operational state for an information technology infrastructure from the federated information stored in the identity vault and actual activity monitored for the plurality of unique identities in the information technology infrastructure, wherein the discovery engine is configured to:
        discover information that describes one or more physical resources and one or more virtualized resources in the information technology infrastructure from the federated information stored in the identity vault;
        discover information that describes one or more services, one or more applications, and one or more workloads running in the information technology infrastructure from the federated information stored in the identity vault;
        discover dependencies that define relationships between the physical resources, the virtualized resources, the services, the applications, and the workloads running in the information technology infrastructure from the federated information stored in the identity vault, wherein discover further includes identifying the relationships as: network addresses, storage locations, capacity requirements, bandwidth requirements, and life-cycle control information; and
        discover information that describes the plurality of unique identities access to the information technology infrastructure, wherein the discovered access information includes the entitlements defined in the identity vault and the actual activity monitored for the plurality of unique identities in the information technology infrastructure; and
    a display device configured to display a plurality of scorecards that visualize the discovered physical resources, the discovered virtualized resources, the discovered services, the discovered applications, the discovered workloads, the discovered dependencies, and the discovered access information.

2. The system of claim 1, wherein the plurality of scorecards include a service listing scorecard that describes business value, usage, and cost associated with the discovered services, the discovered applications, and the discovered workloads.

3. The system of claim 2, further comprising a management infrastructure configured to generate a plan to move or retire one or more of the discovered services, the discovered applications, or the discovered workloads identified in a request to tune the cost of the information technology infrastructure.

4. The system of claim 1, wherein the plurality of scorecards include an operation index scorecard having a primary graphical object and a plurality of secondary graphical objects that visualize an overall operational state for the information technology infrastructure.

5. The system of claim 4, further comprising a management infrastructure configured to generate a plan to tune a balance between agility and rigidness in the information technology infrastructure in response to a request that moves a primary slider mechanism associated with the primary graphical object within a range defined in the primary graphical object.

6. The system of claim 5, wherein the management infrastructure is further configured to refresh the plan to tune complexity, cost, or availability in the information technology infrastructure in response to the request moving one or more secondary slider mechanisms associated with one or more of the plurality of secondary graphical object.

7. The system of claim 1, wherein the plurality of scorecards include a risk heat map scorecard that describes risk in one or more areas of the information technology infrastructure across a plurality of different coverage ratios.

8. The system of claim 7, further comprising a management infrastructure configured to generate a plan to tune the risk in one or more of the areas of the information technology infrastructure identified in a request that further identifies one or more of the plurality of different coverage ratios associated with the identified area.

9. The system of claim 1, wherein the plurality of scorecards include a service placement scorecard that provides a recommended target for deploying one or more of the discovered services, the discovered applications, or the discovered workloads.

10. The system of claim 9, further comprising a management infrastructure configured to generate a plan to deploy one or more of the discovered services, the discovered applications, or the discovered workloads identified in a request to the recommended target, wherein the recommended target includes on of a physical data center, a virtualized data center, or a cloud data center.

11. A method for providing scorecards to visualize services in an intelligent workload management system, comprising:
    storing, in an identity vault, federated information defining entitlements for a plurality of unique identities across a plurality of authentication domains, the entitlements derived from single sign-on workload identities, generated from authentication tokens that define various credentials and permissions assigned to any suitable user, application, system, service, or resource;
    discovering, by a discovery engine, an operational state for an information technology infrastructure from the federated information stored in the identity vault and actual activity monitored for the plurality of unique identities in the information technology infrastructure, wherein discovering the operational state for the infrastructure includes:
        discovering, by the discovery engine, information that describes one or more physical resources and one or more virtualized resources in the information technology infrastructure from the federated information stored in the identity vault;
        discovering, by the discovery engine, information that describes one or more services, one or more applications, and one or more workloads running in the information technology infrastructure from the federated information stored in the identity vault;
        discovering, by the discovery engine, dependencies that define relationships between the physical resources, the virtualized resources, the services, the applications, and the workloads running in the information technology infrastructure from the federated information stored in the identity vault, wherein discovering further includes identifying the relationships as: network addresses, storage locations, capacity requirements, bandwidth requirements, and life-cycle control information and
        discovering, by the discovery engine, information that describes the plurality of unique identities access to the information technology infrastructure, wherein the discovered access information includes the entitlements defined in the identity vault and the actual activity monitored for the plurality of unique identities in the information technology infrastructure; and
    displaying, on a display device, a plurality of scorecards that visualize the discovered physical resources, the discovered virtualized resources, the discovered services, the discovered applications, the discovered workloads, and the discovered dependencies, and the discovered access information.

12. The method of claim 11, wherein the plurality of scorecards include a service listing scorecard that describes business value, usage, and cost associated with the discovered services, the discovered applications, and the discovered workloads.

13. The method of claim 12, further comprising generating, by a management infrastructure, a plan to move or retire one or more of the discovered services, the discovered applications, or the discovered workloads identified in a request to tune the cost of the information technology infrastructure.

14. The method of claim 11, wherein the plurality of scorecards include an operation index scorecard having a primary graphical object and a plurality of secondary graphical objects that visualize an overall operational state for the information technology infrastructure.

15. The method of claim 14, further comprising generating, by a management infrastructure, a plan to tune a balance between agility and rigidness in the information technology infrastructure in response to a request that moves a primary slider mechanism associated with the primary graphical object within a range defined in the primary graphical object.

16. The method of claim 15, further comprising refreshing, by the management infrastructure, the plan to tune complexity, cost, or availability in the information technology infrastructure in response to the request moving one or more secondary slider mechanisms associated with one or more of the plurality of secondary graphical object.

17. The method of claim 11, wherein the plurality of scorecards include a risk heat map scorecard that describes risk in one or more areas of the information technology infrastructure across a plurality of different coverage ratios.

18. The method of claim 17, further comprising generating, by a management infrastructure, a plan to tune the risk in one or more of the areas of the information technology infrastructure identified in a request that further identifies one or more of the plurality of different coverage ratios associated with the identified area.

19. The method of claim 11, wherein the plurality of scorecards include a service placement scorecard that provides a recommended target for deploying one or more of the discovered services, the discovered applications, or the discovered workloads.

20. The method of claim 19, further comprising generating, by a management infrastructure, a plan to deploy one or more of the discovered services, the discovered applications, or the discovered workloads identified in a request to the recommended target, wherein the recommended target includes on of a physical data center, a virtualized data center, or a cloud data center.

* * * * *